US012646224B2

(12) United States Patent
Park et al.

(10) Patent No.: US 12,646,224 B2
(45) Date of Patent: Jun. 2, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Yousun Park, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/852,211

(22) PCT Filed: Mar. 2, 2023

(86) PCT No.: PCT/KR2023/002853
§ 371 (c)(1),
(2) Date: Sep. 27, 2024

(87) PCT Pub. No.: WO2023/191321
PCT Pub. Date: Oct. 5, 2023

(65) Prior Publication Data
US 2025/0218049 A1 Jul. 3, 2025

(30) Foreign Application Priority Data

Mar. 29, 2022 (KR) ........................ 10-2022-0038475
Nov. 2, 2022 (KR) ........................ 10-2022-0144245

(51) Int. Cl.
G06T 9/00 (2006.01)
G06T 9/40 (2006.01)
H04N 19/172 (2014.01)
H04N 19/70 (2014.01)
H04N 19/96 (2014.01)

(52) U.S. Cl.
CPC ................ *G06T 9/001* (2013.01); *G06T 9/40* (2013.01); *H04N 19/172* (2014.11); *H04N 19/70* (2014.11); *H04N 19/96* (2014.11)

(58) Field of Classification Search
CPC ......... G06T 9/001; G06T 9/40; H04N 19/172; H04N 19/70; H04N 19/96
USPC ...................................... 375/240.01
See application file for complete search history.

(56) References Cited

U.S. PATENT DOCUMENTS

2022/0215596 A1* 7/2022 Van der Auwera .... H04N 19/25
2024/0314359 A1* 9/2024 Xu ......................... G06T 9/001

FOREIGN PATENT DOCUMENTS

KR 10-2022-0014037 A 2/2022
KR 10-2022-0027869 A 3/2022
KR 10-2022-0035224 A 3/2022
(Continued)

OTHER PUBLICATIONS

International Search Report and Written Opinion in International Appln. No. PCT/KR2023/002853, mailed on Jun. 8, 2023, 13 pages (with English translation).

*Primary Examiner* — Allen C Wong
(74) *Attorney, Agent, or Firm* — Fish & Richardson P.C.

(57) ABSTRACT

A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

12 Claims, 23 Drawing Sheets

(56) References Cited

FOREIGN PATENT DOCUMENTS

| | | | |
|---|---|---|---|
| WO | WO 2022/050650 A1 | 3/2022 | |
| WO | WO 2022/060176 A1 | 3/2022 | |

* cited by examiner

FIG. 7
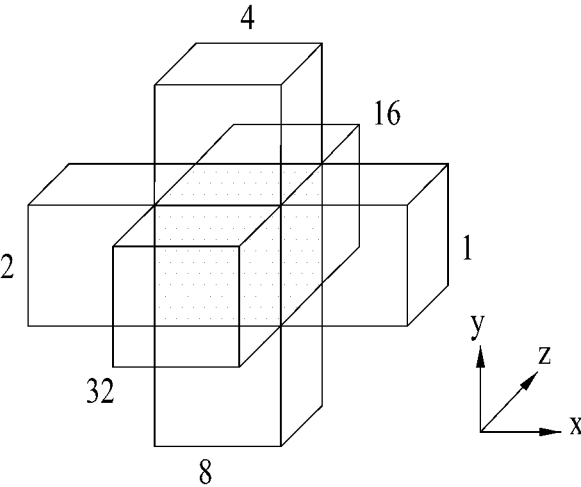
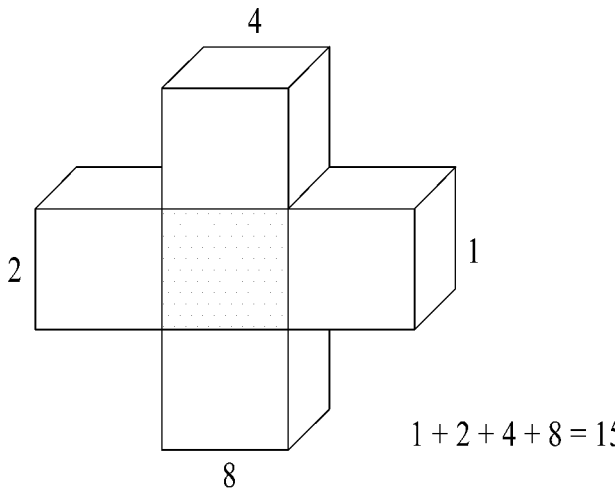
$1 + 2 + 4 + 8 = 15$

FIG. 8

Level of details

Figure 1. Example of generation of a predictive tree structure

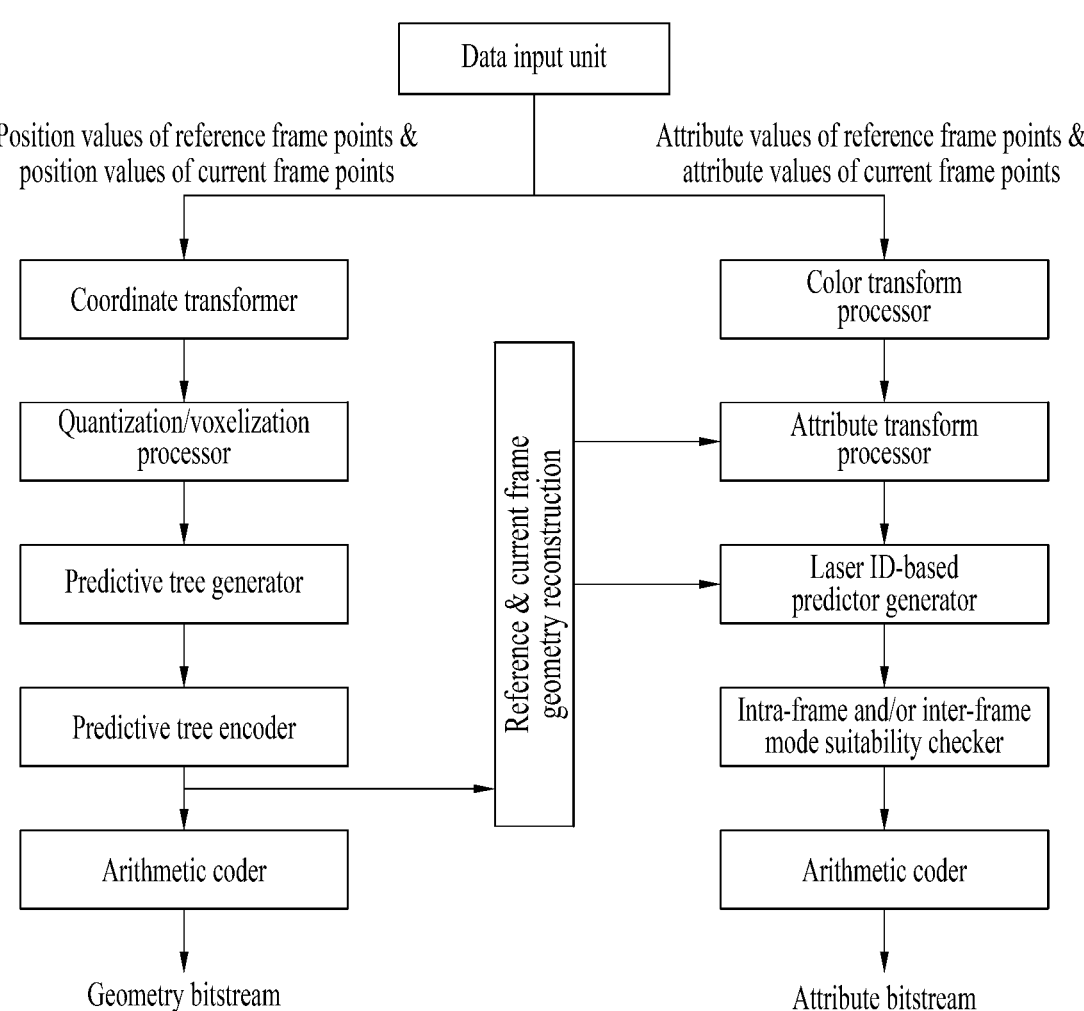

Data input unit

Position values of reference frame points &
position values of current frame points Attribute values of reference frame points &
attribute values of current frame points Coordinate transformer Color transform
processor Quantization/voxelization
processor Attribute transform
processor Predictive tree generator Reference & current frame
geometry reconstruction Laser ID-based
predictor generator Predictive tree encoder Intra-frame and/or inter-frame
mode suitability checker Arithmetic coder Arithmetic coder Geometry bitstream Attribute bitstream

FIG. 21

| seq_parameter_set_rbssp( ) { | Descriptor |
|---|---|
| ... | |
|    laserID_use_predtree_flag | u(1) |
|    if(laserID_use_predtree_flag) { | |
|      pred_weight | ue(v) |
|      predictor_distortion_ration_threshold | ue(v) |
|    } | |
|    ... | |
| } | |

FIG. 22

| tile_parameter_set( ) { | Descriptor |
|---|---|
| num_tiles | ue(v) |
| for(i=0;i<num_tiles:i++) { | |
| tile_bounding_box_offset_x[i] | se(v) |
| tile_bounding_box_offset_y[i] | se(v) |
| tile_bounding_box_offset_z[i] | se(v) |
| tile_bounding_box_scale_factor[i] | se(v) |
| tile_bounding_box_size_width[i] | se(v) |
| tile_bounding_box_size_height[i] | se(v) |
| } | |
| laserID_use_predtree_flag | u(1) |
| if(laserID_user_predtree_flag) { | |
| pred_weight | ue(v) |
| predictor_distortion_ratio_threshold | ue(v) |
| } | |
| } | |

FIG. 23

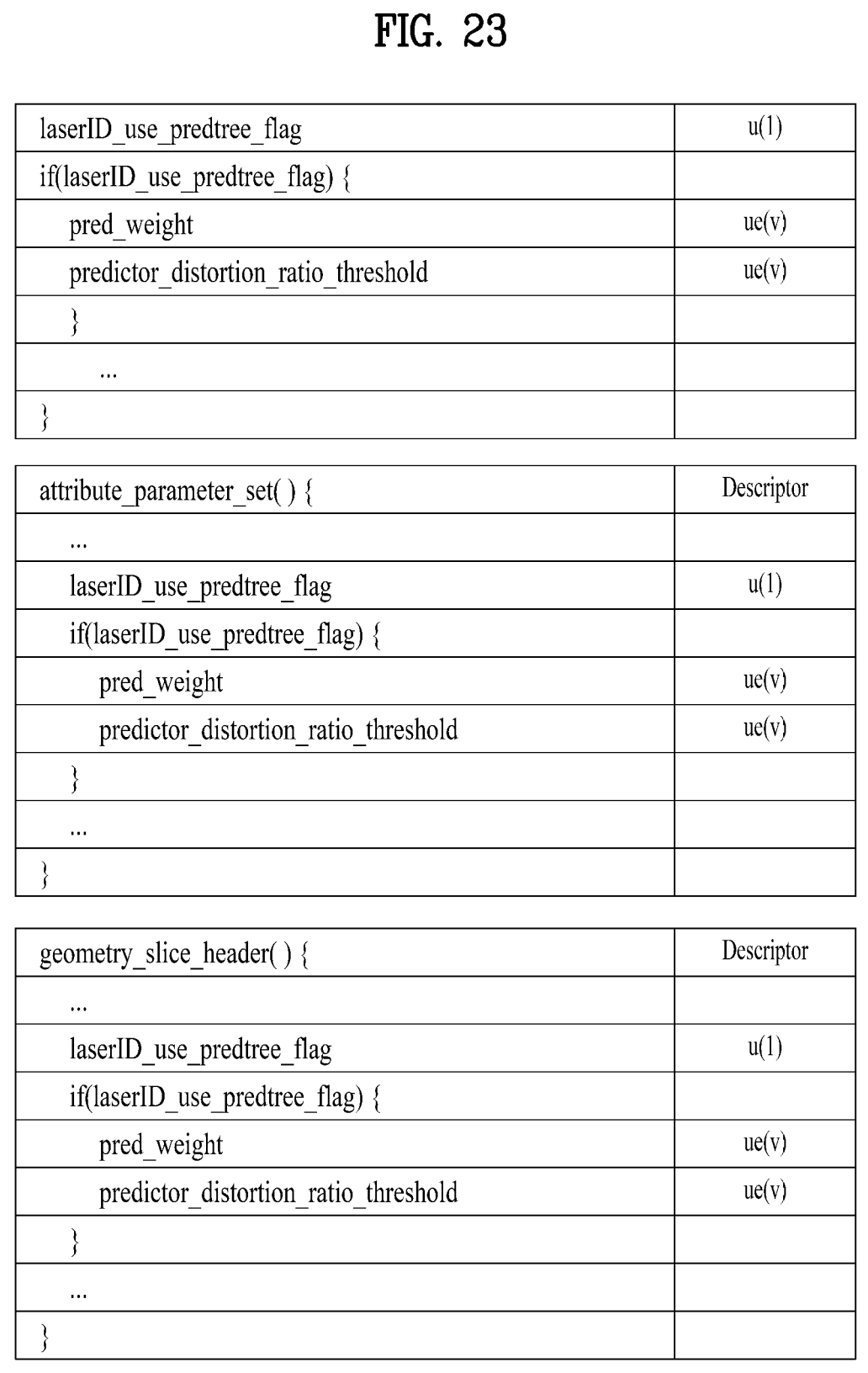

| | |
|---|---|
| laserID_use_predtree_flag | u(1) |
| if(laserID_use_predtree_flag) { | |
|    pred_weight | ue(v) |
|    predictor_distortion_ratio_threshold | ue(v) |
|    } | |
|     ... | |
| } | |

| attribute_parameter_set( ) { | Descriptor |
|---|---|
|   ... | |
|   laserID_use_predtree_flag | u(1) |
|   if(laserID_use_predtree_flag) { | |
|     pred_weight | ue(v) |
|     predictor_distortion_ratio_threshold | ue(v) |
|    } | |
|    ... | |
|   } | |

| geometry_slice_header( ) { | Descriptor |
|---|---|
|   ... | |
|   laserID_use_predtree_flag | u(1) |
|   if(laserID_use_predtree_flag) { | |
|     pred_weight | ue(v) |
|     predictor_distortion_ratio_threshold | ue(v) |
|    } | |
|    ... | |
|   } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2023/002853, filed on Mar. 2, 2023, which claims the benefit of Korean Application Nos. 10-2022-0144245, filed on Nov. 2, 2022, and 10-2022-0038475, filed on Mar. 29, 2022. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may cover other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding point cloud data, and transmitting a bitstream containing the point cloud data. In another aspect of the present disclosure, a method of receiving point cloud data may include receiving a bitstream containing point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 7 shows an example of a neighbor node pattern according to embodiments;

FIG. 8 illustrates an example of point configuration in each LOD according to embodiments;

Figure 17:
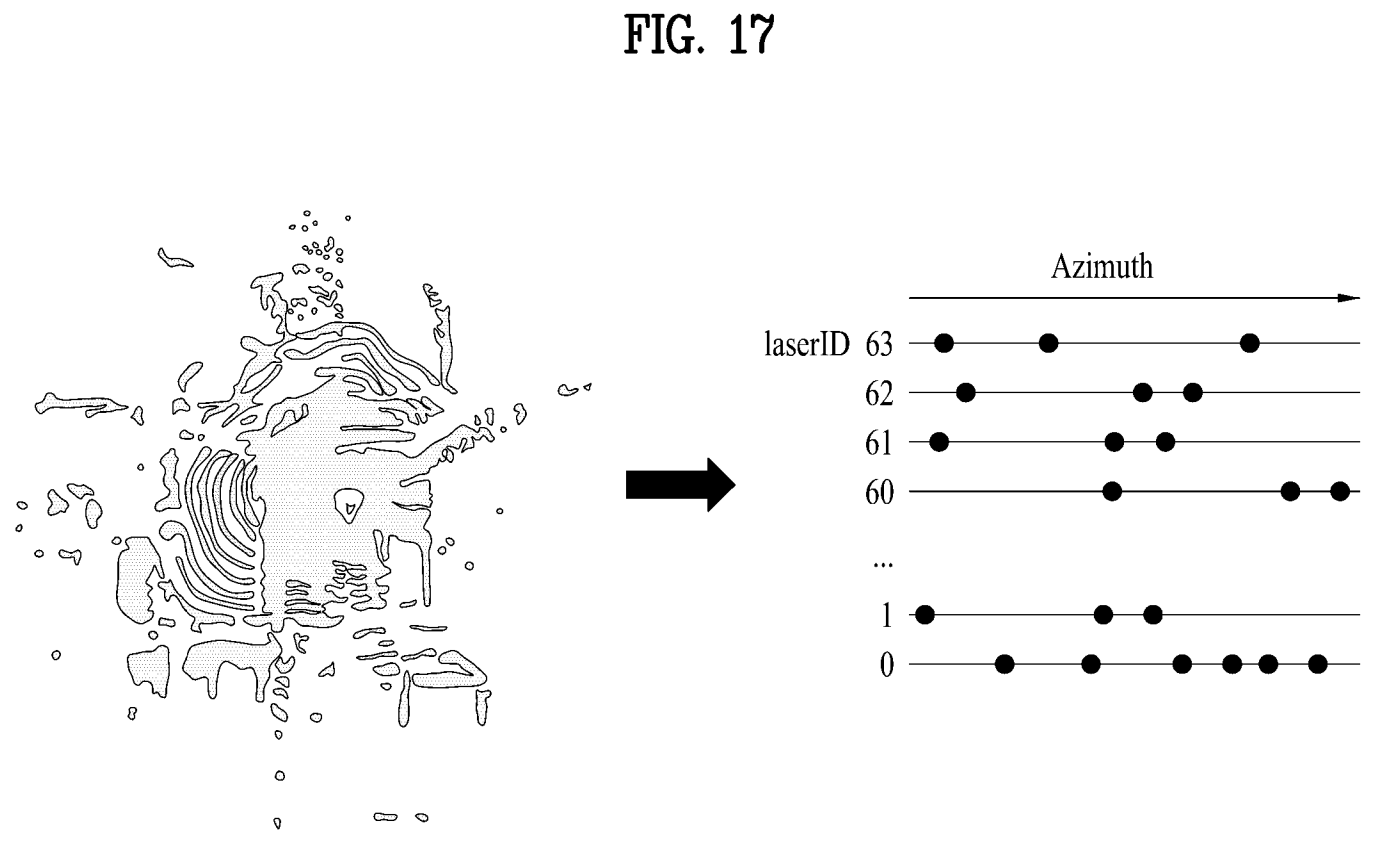

FIG. 17 illustrates a method of selecting a predictor node in a reference frame based on laserID according to embodiments;

FIG. 18 illustrates a point cloud data transmission device according to embodiments;

FIG. 21 illustrates a sequence parameter set according to embodiments;

FIG. 22 illustrates a tile parameter set according to embodiments;

FIG. 23 illustrates a geometry parameter set, an attribute parameter set, and a geometry slice header according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
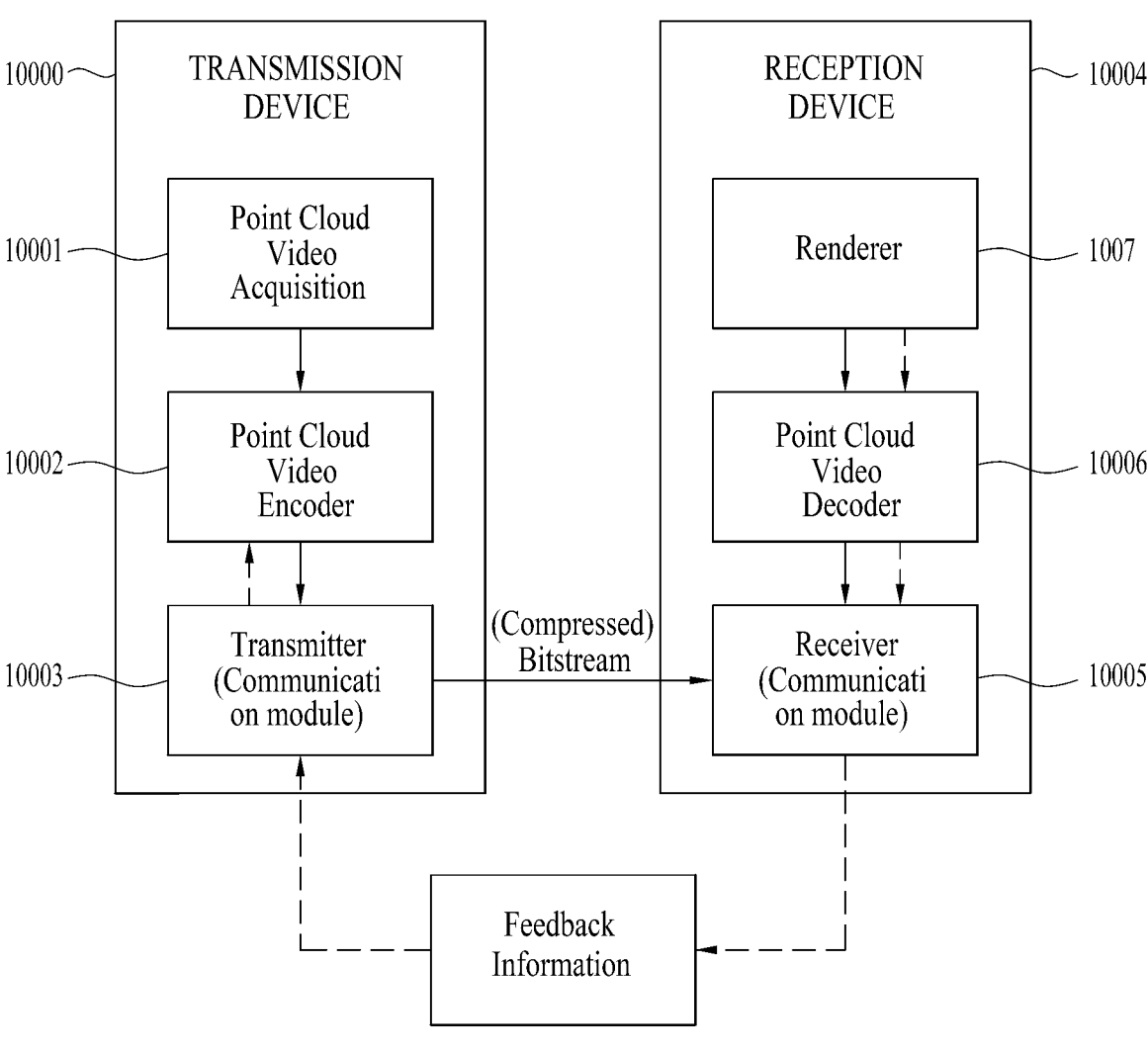
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process to the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/ or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
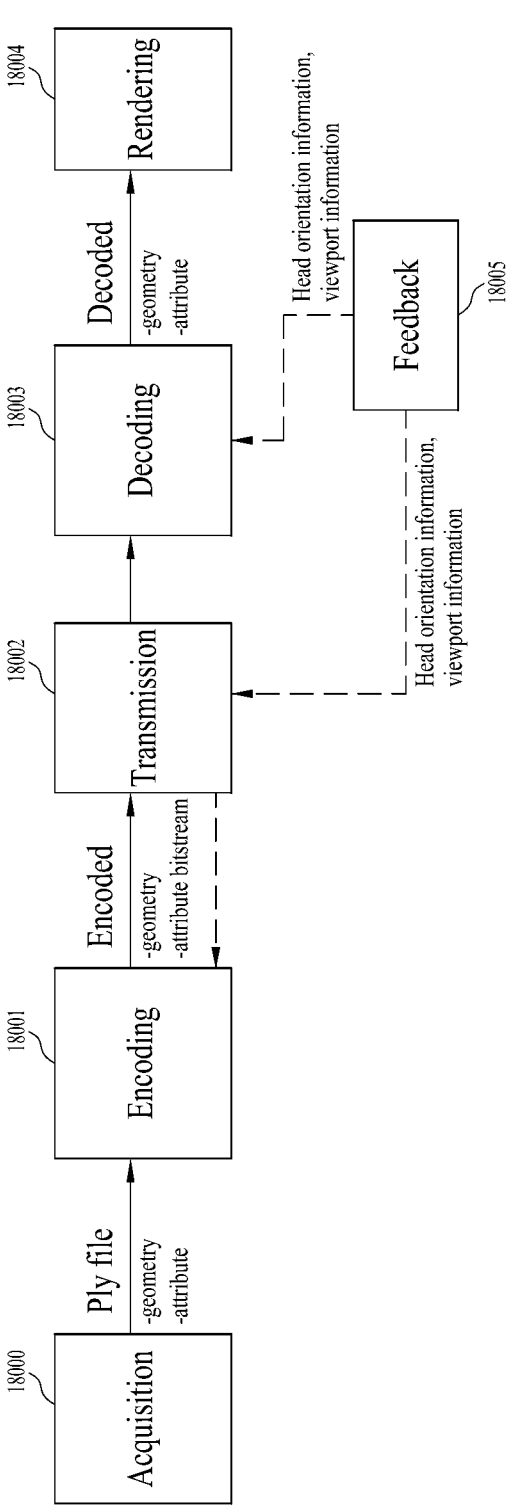
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
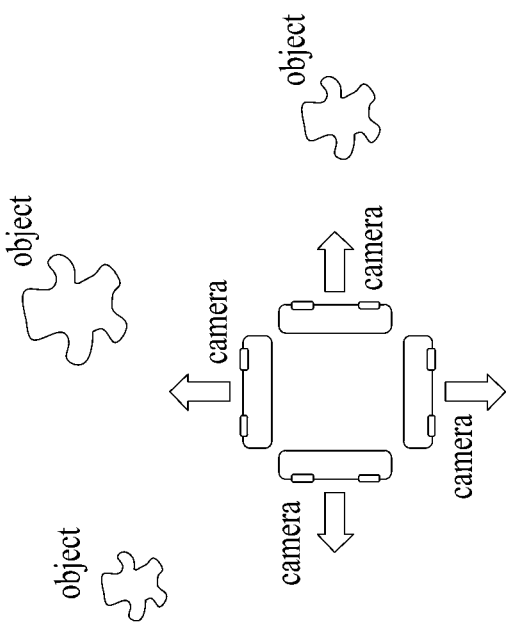
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 and 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
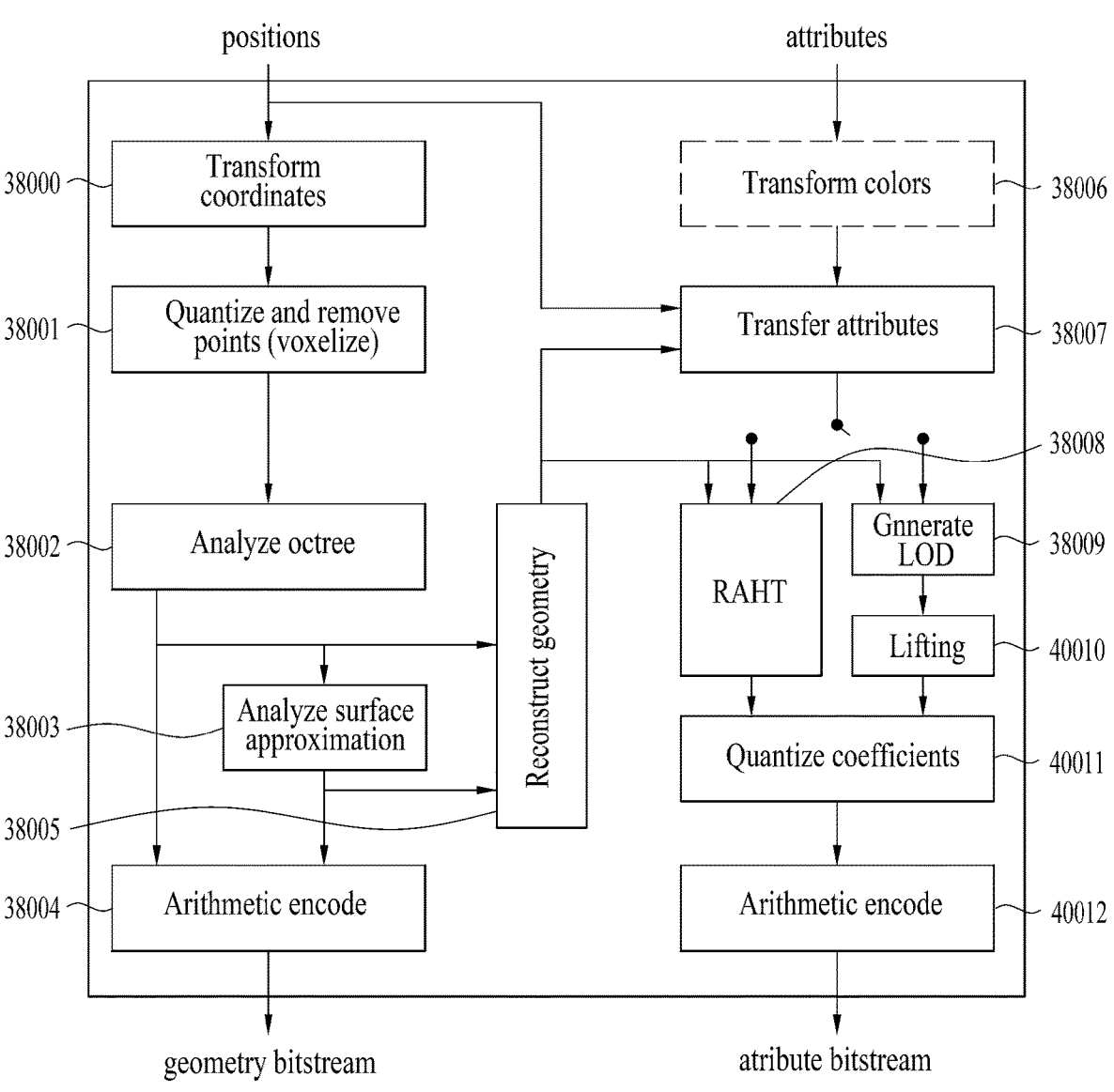
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
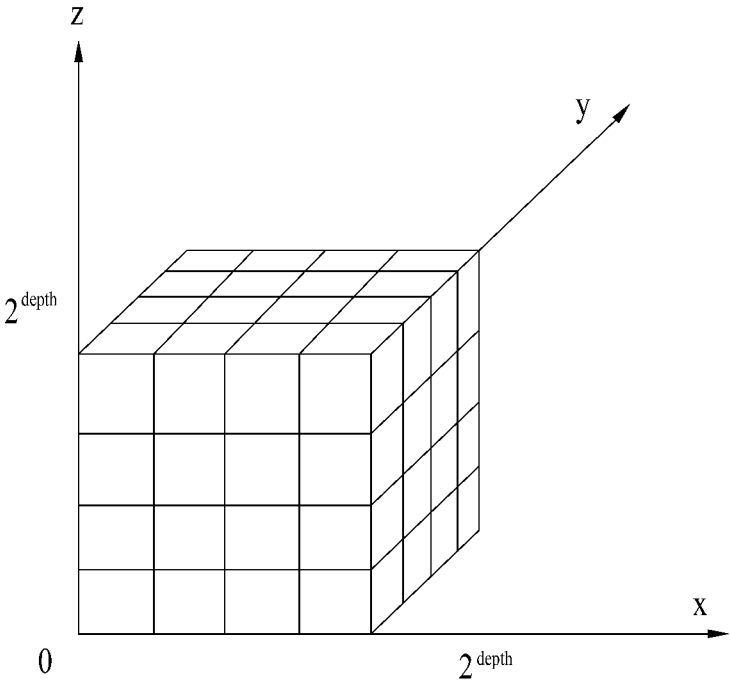
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
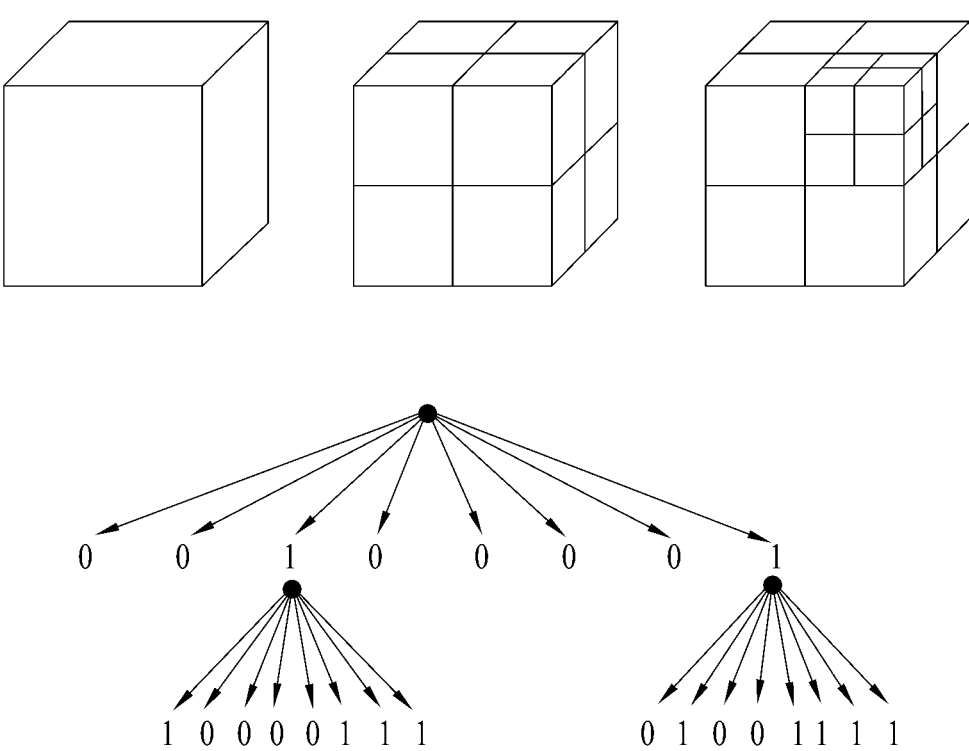
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}\left(\text{Log2}\left(\text{Max}\left(x^{int}_n, y^{int}_n, z^{int}_n, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix};$$  i)

-continued $$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$ ii)

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}^2 \end{bmatrix}$$ iii)

The minimum value of the sum is estimated, an the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n | |
| --- | --- |
| n | triangles |
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
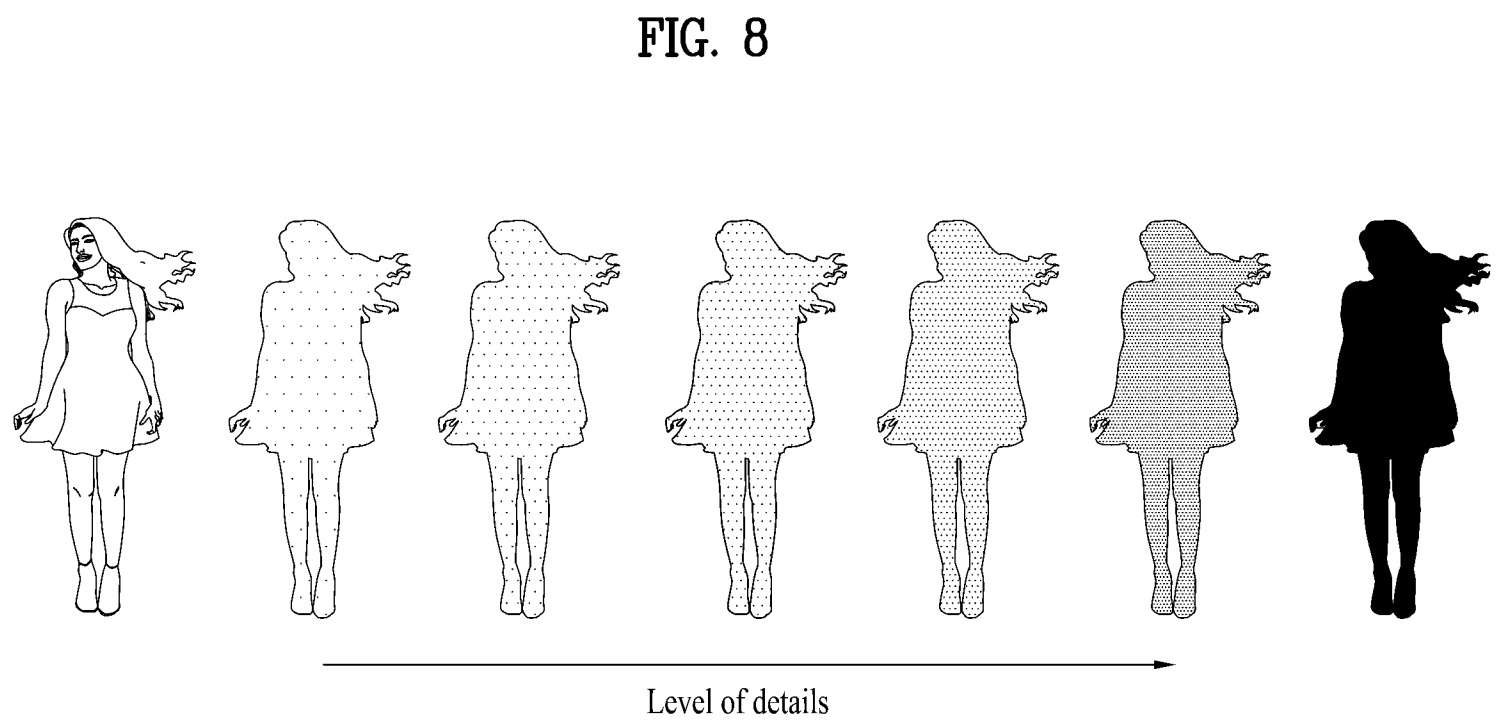

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
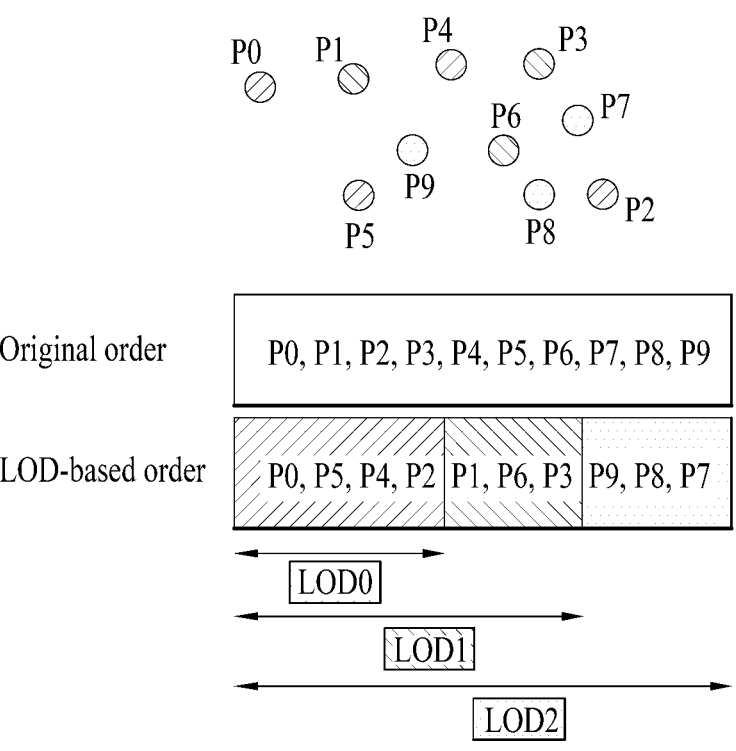
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

| Attribute prediction residuals quantization pseudo code |
| --- |
| ```
int PCCQuantization(int value, int quantStep) {
if( value >=0) {
return floor(value / quantStep + 1.0 / 3.0);
} else {
return -floor(-value / quantStep + 1.0 / 3.0);
}
}
``` |

TABLE

| Attribute prediction residuals inverse quantization pseudo code |
| --- |
| ```
int PCCInverseQuantization(int value, int quantStep) {
if( quantStep ==0) {
return value;
} else {
return value * quantStep;
}
}
``` |

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\ w1001} \begin{bmatrix} g_{1_{0,0,0z}} \\ g_{1_{0,0,1}} \end{bmatrix}$$

Figure 10:
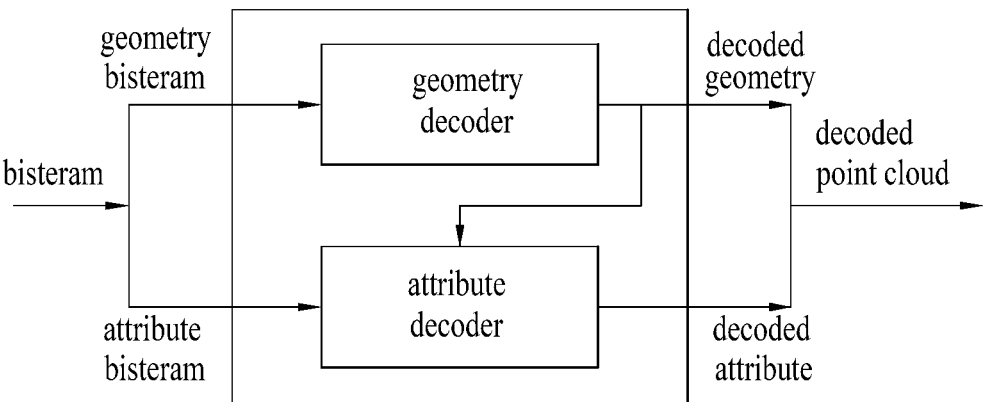
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
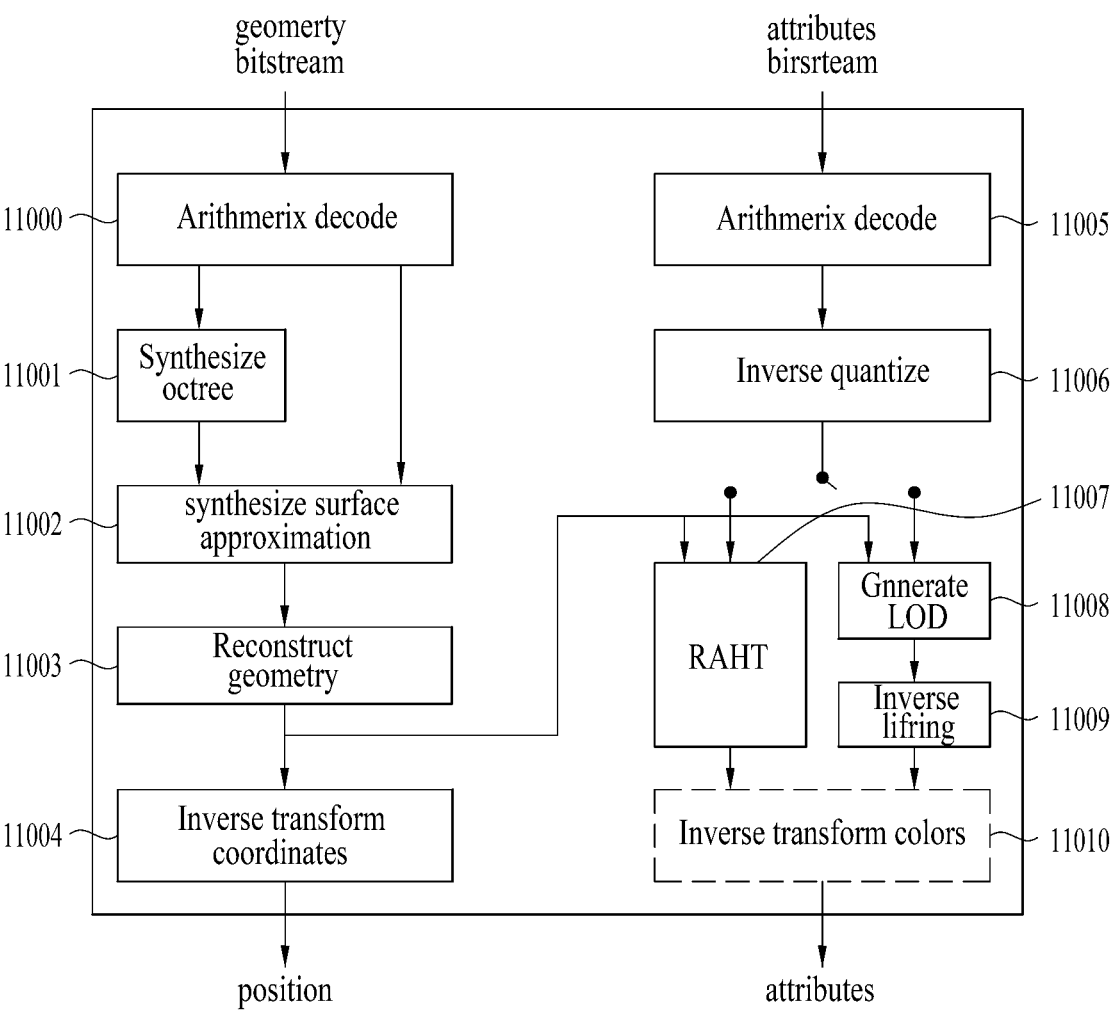
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process to the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process to the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the reverse process to the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
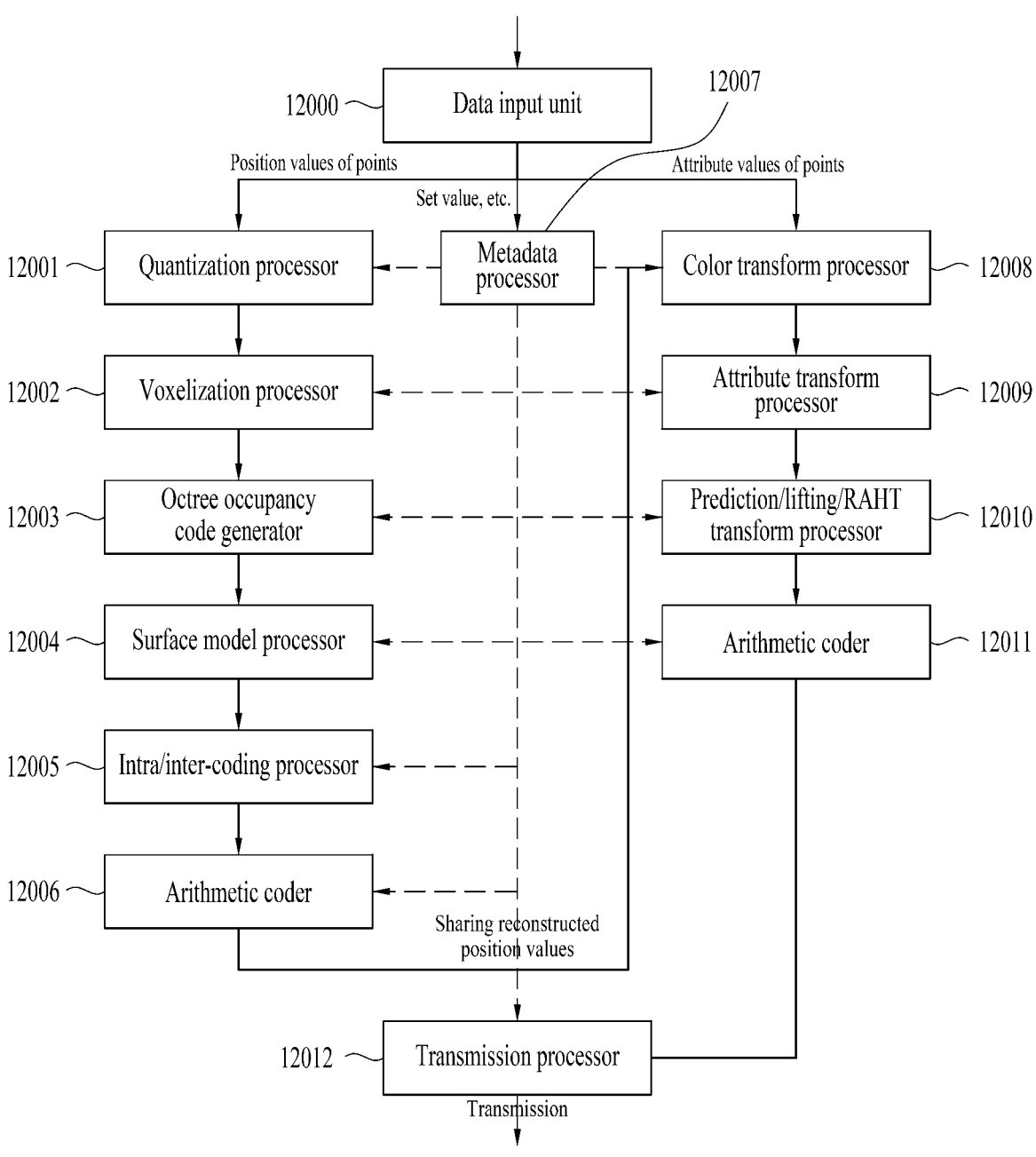
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
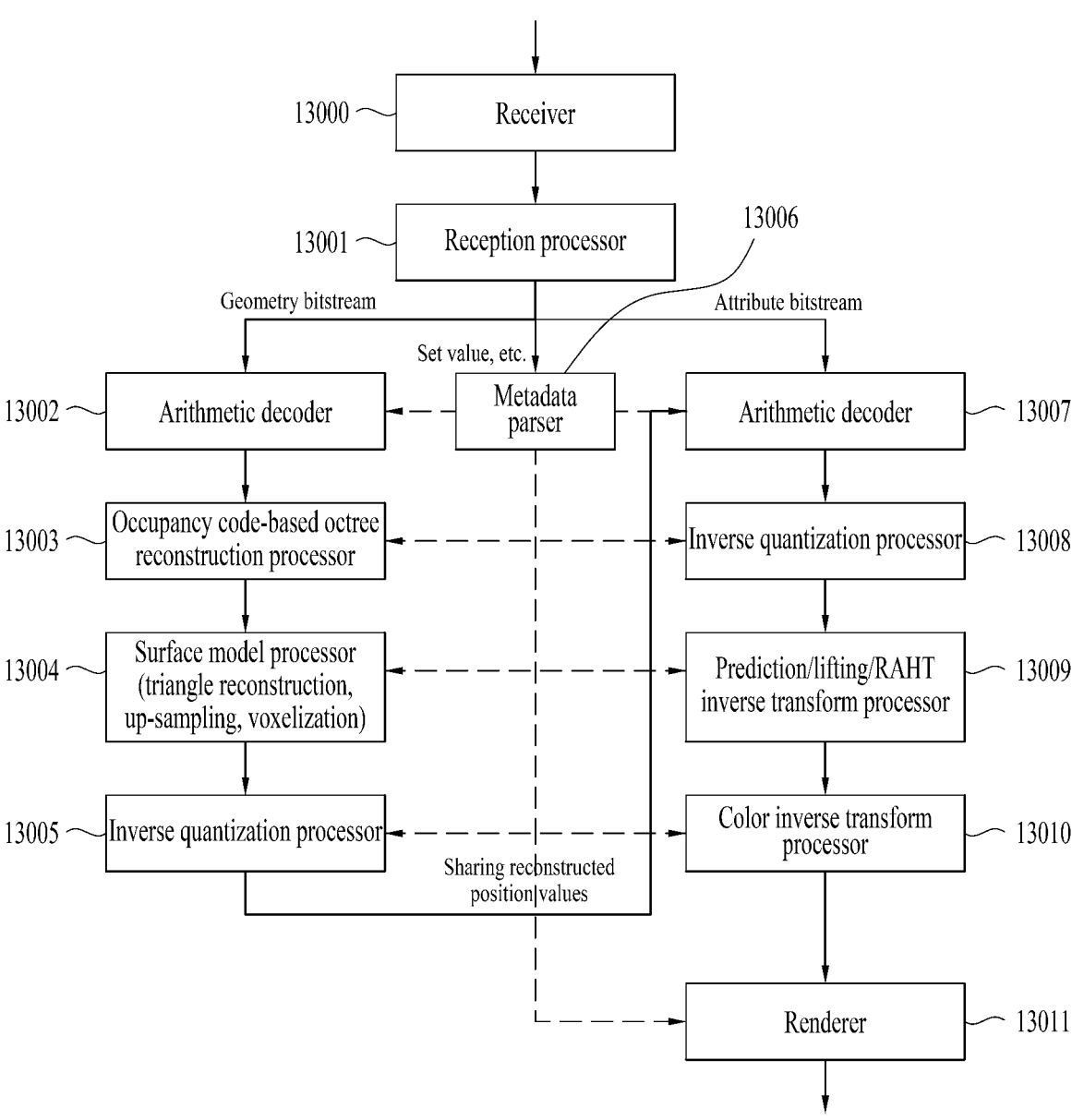
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process to the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
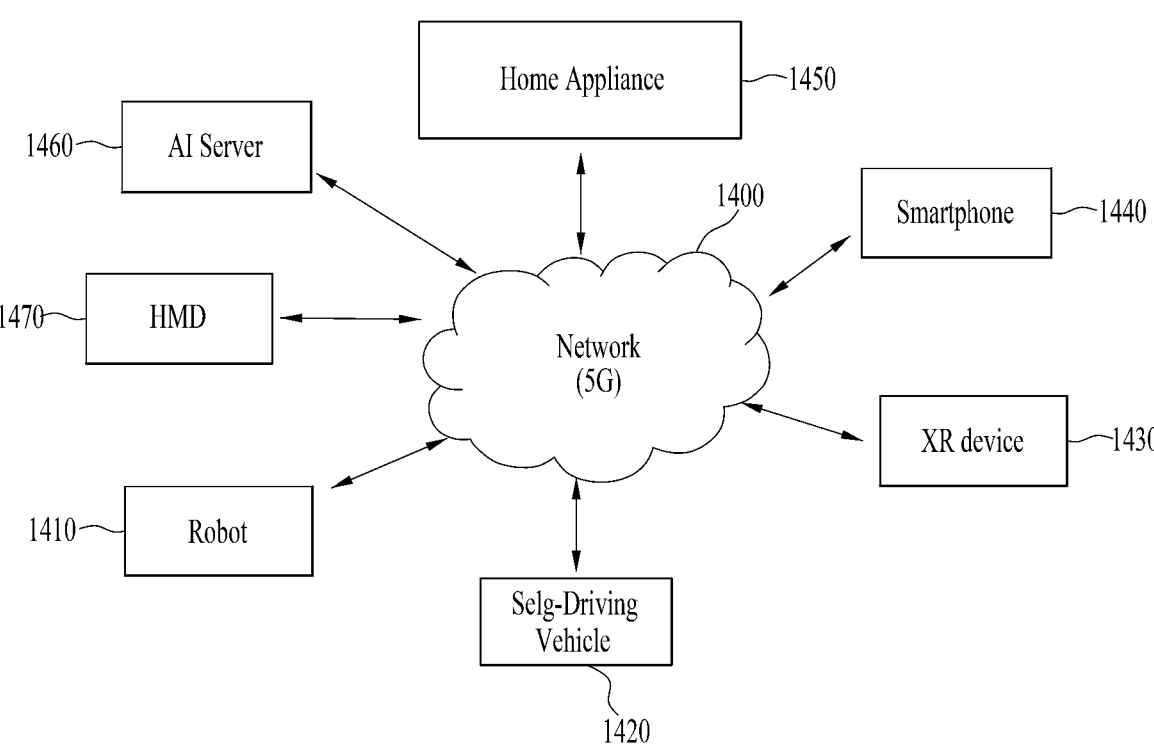
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
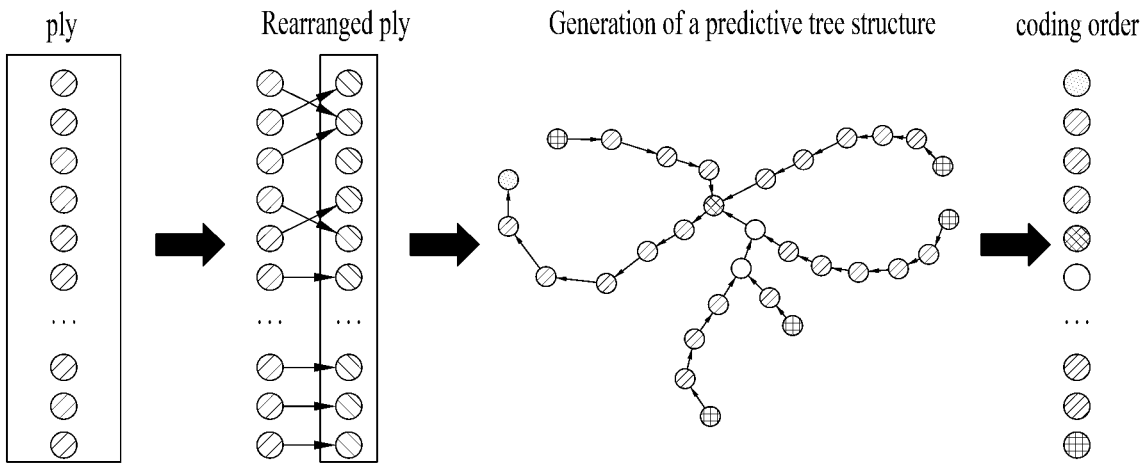
FIG. 15 illustrates a method of generating a predictive tree structure according to embodiments.
Figure 16:
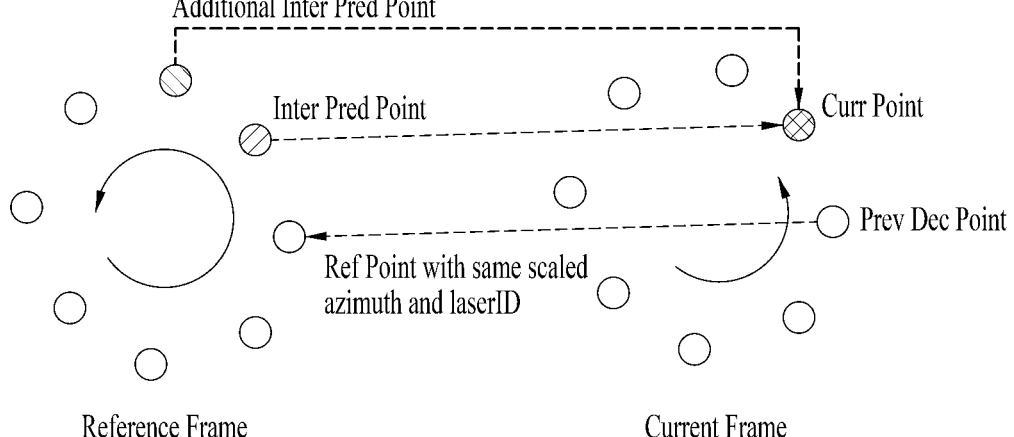
FIG. 16 illustrates inter-frame encoding/decoding according to embodiments.
Figure 24:
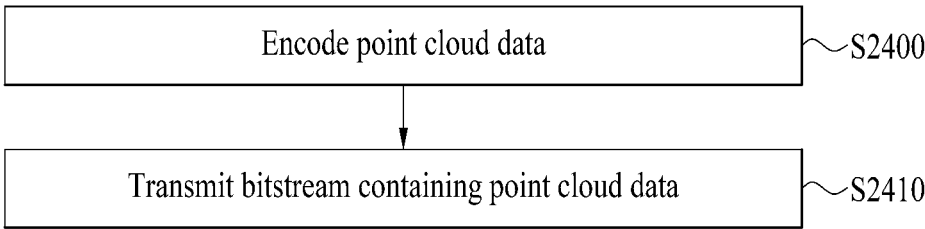
FIG. 24 illustrates a method of transmitting point cloud data according to embodiments.

The point cloud data transmission method/device according to the embodiments is to be construed as a term referring to the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the devices of FIG. 14, the predictive tree-based encoding of FIG. 15, the inter-frame predictive tree-based compression of FIG. 16, the compression based on sorting by azimuth according to laser ID of FIG. 17, the intra-frame and/or inter-frame encoders of FIG. 18, the bitstream generation of FIGS. 20 to 23, the transmission method of FIG. 24, and the like.

Figure 19:
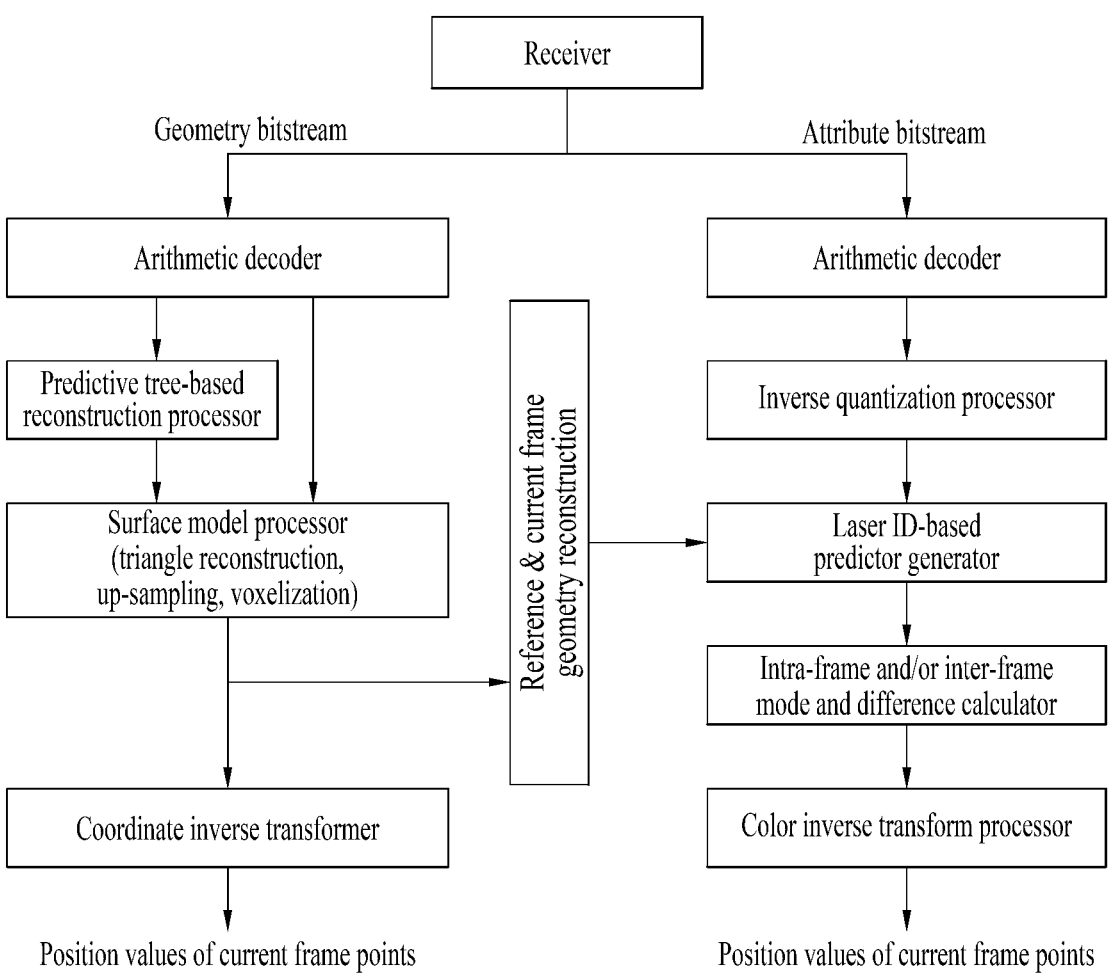
FIG. 19 illustrates a point cloud data reception device according to embodiments.
Figure 25:
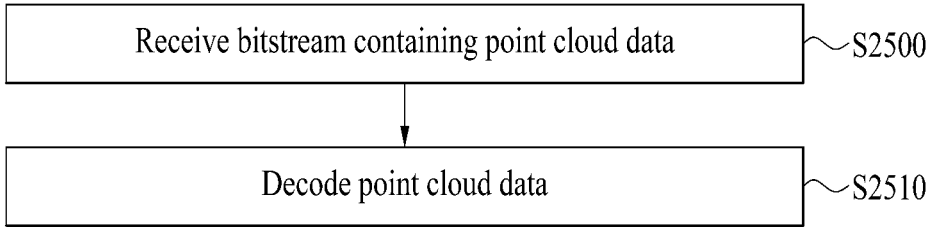
FIG. 25 illustrates a method of receiving point cloud data according to embodiments.

The point cloud data reception method/device according to the embodiments is construed as a term referring to the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the devices of FIG. 14, the predictive tree-based decoding of FIG. 15, the inter-frame predictive tree-based reconstruction of FIG. 16, the reconstruction based on sorting by azimuth according to laser ID of FIG. 17, the intra-frame and/or inter-frame decoders of FIG. 19, the bitstream parsing of FIGS. 20 to 23, the reception method of FIG. 25, and the like.

The point cloud data transmission/reception method/device according to the embodiments may be referred to as a method/device according to the embodiments.

According to embodiments, geometry data, geometry information, position information, and the like constituting the point cloud data are construed as having the same meaning. Attribute data, attribute information, and the like constituting point cloud data are construed as having the same meaning.

A point is an element of a point cloud that contains a position in a coordinate system and zero or one or more attributes. A point cloud is a list of points. A point cloud sequence is a sequence of one or more point clouds. A point cloud frame is a point cloud in a point cloud sequence. Geometry is point positions related to a set of points. An attribute is a scalar or vector property related to each point in a point cloud. For example, it may be color, reflectance, frame index, or the like. A slice is the geometry and attributes for a portion or the entirety of an encoded point cloud frame. A tile is a set of slices.

The method/device according to the embodiments may include and carry out an attribute compression method using laserID of a point cloud predictive tree.

While research has been conducted on compressing geometry using an intra-frame predictive tree, research has not been conducted on compressing attribute information using inter-frame predictive tree information. The method/device according to the embodiments may include and carry out an inter-frame attribute compression method using laserID in predictive tree information.

The method/device according to the embodiments may employ a structure that allows for attribute compression based on inter-frame geometry information to compress 3D point cloud data. In point cloud data, a dynamic point cloud categorized into Category 3 is composed of multiple point cloud frames and is primarily intended for use cases with self-driving data. A set of frames is called a sequence. A sequence contains frames composed of values of the same attribute. Thus, the attribute values have data features such as motion or changes in attribute value with respect to a previous or subsequent frame. In the current standard, geometry-based inter-frame compression has been well developed, but inter-frame attribute compression has not been developed.

Embodiments therefore propose a structure and method for applying inter-frame features found in geometry information in attribute compression, for the purpose of compression between frames in the Category 3 sequence. Inter-frame geometry compression may be broadly divided into octree inter-frame compression and predictive tree inter-frame compression. In this embodiment, attribute compression is performed based on the information employed in predictive tree inter-frame compression. Further, for points that are not suitable in the inter-frame information attribute compression may be performed based on the intra-frame geometry information to increase the compression efficiency.

FIG. 15 illustrates a method of generating a predictive tree structure according to embodiments.

A method/device according to the embodiments may generate a predictive tree as shown in FIG. 15.

The predictive tree structure is generated through a process of constructing a tree structure with connections between points from xyz coordinates of a point cloud. To construct the predictive tree, input points are sorted by a certain criterion, and the predictive tree structure is generated by calculating predicted values according to the neighbor nodes from the rearranged ply. The method of generating and encoding the predictive tree structure is shown in FIG. 15.

Referring to FIG. 15, the ply data may be received by the encoder/decoder, and the data may be sorted in an order that is efficient for encoding/decoding. Considering the characteristics between the sorted points, predicted values close to the value of the current point are generated, and the predicted points for the current point may be represented in a tree structure. Parent and child points may be represented by an arrow. The arrow may be constructed to point from the current point to a parent (neighbor and/or predicted value) point. When the prediction relationship between points is represented in a tree structure, residuals for the predicted points with respect to the current point may be generated by traversing from the root node (point) to the child points, and encoded.

FIG. 16 illustrates inter-frame encoding/decoding according to embodiments.

Further to FIG. 15, the method/device according to the embodiments may perform inter-frame predictive tree-based compression, as shown in FIG. 16. To this end, an inter-frame structure may be used in which one inter pred point is additionally selected from the reference frame, or two points are used as additional inter pred points.

Referring to FIG. 16, the point with the smaller residual between the two points (additional inter pred point and inter pred point) that are candidate predictors may be used as the predictor for the current point. In order to encode or decode the current point contained in the current frame, the method/device according to the embodiments may find, in the reference frame for the current frame, a reference point close to the previously decoded (restored) point. The reference point may have the same laser ID and the same scaled azimuth as the previously decoded point. The next point after the reference point or the next point after the next point, whichever has the most similar geometry and/or attributes to the current point, may be used as a predictor. That is, the residual between the geometries and/or attributes of the selected predictor and the current point may be encoded and decoded.

The transmission method/device according to the embodiments compresses the geometry and performs attribute compression. For example, it performs intra-frame encoding may using predicting/lifting/RAHT transform coding. For inter-frame encoding/decoding, using predicting/lifting/RAHT transform coding by combining the previous and current frames into a single frame has been proposed, but the compression efficiency thereof is only about 5% of that of intra-frame coding. Further, it cannot support the predictive tree structure, which is intended for low-latency decoding. Embodiments may be provided to address the aforementioned issues.

Whether the geometry coding order is maintained may be determined depending on whether the decoder generates a predictive tree. Embodiments may apply different coding methods depending on whether the geometry coding order is maintained. Unlike conventional techniques that simply combine two frames into one frame to be coded, the inter-frame predictive tree information may be utilized for attribute compression as decoded information. In intra-frame compression, the process of Morton generation and neighbor node search overlaps with the predictive tree information generated based on geometry, and thus an issue of redundant execution may be addressed. The existing information generated from a predictive tree based on the distance may be maximally utilized in attribute compression.

The actual geometry coding order may be maintained in attribute compression, or the geometries (points) may be rearranged. Maintaining the geometry coding order may have the advantage of reducing rearrangement time at the encoder and decoder, but may result in lower compression according to the geometry coding order. If the rearrangement is performed based on a specific criterion without maintaining the geometry coding order, the execution time and memory usage for the rearrangement at the encoder and decoder may increase, but the compression rate may increase. Therefore, the time and compression rate at the encoder and decoder may determine whether to maintain the geometry coding order.

For the predicting transform, lifting transform, and RAHT currently used for attribute compression, the geometry order is changed to morton order to code the attributes. However, in predictive geometry coding, a predictive tree is constructed for parent-child relationships between neighboring points, and attribute values between points may be encoded based on previous points. Accordingly, embodiments may apply an attribute coding method based on predictive tree information available after predictive tree geometry coding.

Conventional predictive tree geometry coding creates a parent-child relationship between nodes and calculates a predictive value for each point. The calculation of the predicted value is determined by the order of the sorted points and the position value of a neighboring point in the order of the sorted points. The predicted value is calculated at the current node based on the position values of the parent node and the parent-parent node. The methods to calculate the predicted value in the conventional predictive tree encoding include intra-frame calculation methods (four methods) and inter-frame calculation methods (two methods).

1. No prediction; 2. Delta prediction (p0); 3. Linear prediction (2p0-p1); 4. Parallelogram prediction (p0+p1−p2); 1. Inter pred point (p'0); 2. Additional inter pred point (p'1).

The inter pred point specifies a point that has the same laserID value and the most similar azimuth value in the decoded reference frame as a reference point. The additional inter pred point refers to a point having a less azimuth value than the inter pred point and the same laserID.

Embodiments may include a method for compressing intra-/inter-frame attributes in point cloud data using a geometry predictive tree. For inter-frame attribute compression, embodiments provide a condition for selecting points having the required geometry information from the intra-frame information and the inter-frame information to be used for compression. Embodiments include a method to extend the existing intra-frame predictive tree geometry compression to enable attribute compression. For example, the method may include a method of selecting a predictor node in a reference frame based on laserID, and a method of determining compression based on an inter-/intra-frame predictor node set.

When the proposed geometry attribute coding method is used in a frame, geometry coding using a predictive tree enables low-latency coding, but low-latency cannot be achieved in attribute compression. Therefore, true low-latency coding is not possible. The proposed method may further provide a method of selecting a predictor node in the reference frame based on laserID and a compression determination method using an inter-frame/intra-frame predictor node set to improve the attribute compression performance.

Referring to FIG. 16, an attribute compression method using inter-frame geometry predictive tree is illustrated.

Currently, geometry compression using an intra-frame predictive tree is available. The inter-frame geometry predictive tree may reference up to two previously decoded points in the current frame, and select a mode according to a calculation equation and deliver the same as signaling information to the decoder. At this time, one inter pred point corresponding to the current point in the previous frame is selected as a point with the closest x, y, and z geometry values (reference point). At this time, one more point may be selected in the reference frame. As shown in FIG. 16, an inter pred point and an additional inter pred point are selected as candidates. In one of the inter pred point and the additional inter pred point is selected as a predictor for the current point, a point with a smaller (current point-predictor) difference may be selected. Based on the selected point in the reference frame, up to three previously decoded points in the reference frame may be selected as predictors to perform inter-frame geometry predictive coding.

The inter pred point and additional inter pred point selected from the geometry may be used to compress the attributes. The point selected in the reference frame (i.e., the inter pred point or additional inter pred point) may be determined as a predictor point or another point may be determined as the reference point. To determine the reference point, a point with a small Euclidean distance in x, y, and z between the current point and the predictor point may be selected as a predictor node.

FIG. 17 illustrates a method of selecting a predictor node in a reference frame based on laserID according to embodiments.

The point cloud data transmission method/device according to the embodiments (the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the devices of FIG. 14, the predictive tree-based encoding of FIG. 15, the inter-frame predictive tree-based compression of FIG. 16, the intra-frame and/or inter-frame encoders of FIG. 18, and the transmission method of FIG. 24) may select a predictor node, as shown in FIG. 17.

The point cloud data reception method/device according to the embodiments (the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the devices of FIG. 14, the predictive tree-based decoding of FIG. 15, the reconstruction based on sorting by azimuth according to laser ID of FIG. 17, the intra-frame and/or inter-frame decoders of FIG. 19, and the reception method of FIG. 25) may select a predictor node, as shown in FIG. 17.

In the operation of geometry compression using the predictive tree, the encoding method/device may transform the coordinate system to a spherical coordinate system using radius, azimuth, and laserID, and search for the predictor node. Then, the spherical coordinate system may not be retransformed to the Cartesian coordinate system in the predictive tree. Point information using radius, azimuth, and laserID of the current spherical coordinate system may be divided into 0 to 63 or 0 to 127 based on laserID. The reason for dividing the information based on the laserID as a reference is that when a lidar laser scans once, only one probing point is acquired and generated due to the nature of the laser. The value of azimuth according to the laserID may be in the range of $-\pi$ to $+\pi$. When sorting is performed based on the azimuth, azimuth values corresponding to laserIDs are generated, as shown in FIG. 17.

Referring to FIG. 17, in the distribution of data acquired by the laser, the center origin may be where the radar is located. Circles from the circle closest to the origin to circles having larger radii may each have a laserID.

A point cloud sorted by azimuth according to laserID is generated for each of the reference frame and the current frame. To select a predictor in the reference frame for the current point, the point with the closest azimuth for the same laserID is selected. The value of the attribute of the selected point may be a candidate for the predictor node for compressing the current point and may be selected by the same criteria in the current frame.

The transmission/reception method/device according to the embodiments may determine compression using an inter-/intra-frame predictor node set as follows.

The actual compression may be performed using the inter-/intra-frame predictor node based on laserID. Among the attributes, the reflectance has the most similar value to the reflectance of the reference frame due to its characteristics. Accordingly, for compression, a candidate in the reference frame may be weighted so as to be more favorable for selection. The equation for weighting may be given as follows:

$$predEligible = predInter * weight + predIntra; \text{ or}$$

$$predEligible\_reflectance = \{predInter1 * weight$$

$$\|predInter2 * weight\|predIntra1\|predIntra2\|predIntra3\}.$$

predEligible_reflectance is a throwhold that determines whether to apply a weight.

weight is the weight.

predInter1 is the reflectance for the inter-frame predictor node.

predIntra1 is the reflectance for the intra-frame predictor node.

weight is the weight, which may be delivered from the encoder to the decoder by pred_weight.

When predEligible_reflectance is greater than or equal to a threshold, the transmission method/device according to the embodiments computes the mode using only the predictor node in the reference frame and transmits the residual. When predEligible is less than the threshold, the mode and residual are computed using only the predictor node in the current frame and transmitted.

predEligible_reflectance is the predicted value of reflectance to use for prediction, calculated per point for coding. The value obtained by subtracting the value of predEligible (predEligible_reflectance) from the value of reflectance for the current point is the residual for the new predictor. One of predInter1*weight, predInter2*weight, predIntra1, predIntra2, or predIntra3 may be selected as the mode by the encoder. The decoder may decode the attribute value (reflectance) of the current point by adding the residual to the predictor in the signaled mode.

The decoder may determine whether to apply attribute compression per unit using predEligible_reflectance. The unit of application may be a whole frame, a road/object, an individual object, or an LPU/PU. Once the encoder signals whether to apply the compression, the decoder may back-compute attribute information per unit of application. To use the condition of predEligible_reflectance, the residuals between the reflectance of the current point and the values of predInter1, predInter2, predIntra1, predIntra2, and predIntra3 are checked, respectively. Among the residuals, the residual for predInter is for a value obtained by multiplying predInter by a weight. The smallest residual is signaled as the mode, and the decoder performs the inverse operation by adding the residuals using the predictor as the mode.

The mode must be checked for suitability to signal the condition selected from the candidates for the predictor. The mode may be selected by the difference between the quantized conditions or the original attribute values in order to select the candidate that may send the smallest difference among the four or multiple candidates selected as predictors. The conditions used by the predictor generator become the conditions for determining the suitability of the mode, and an attribute value that provides the smallest difference or an attribute value that does not yield the smallest difference, but is most relevant to compression of the difference of a subsequent point is signaled as the mode.

As for the method of transmitting the difference according to the suitability of the mode, the conditions selected by the encoder is signaled to the decoder, and the encoder and decoder perform calculation per point using the same condition as the mode. At this time, the difference according to the mode is delivered. For the difference, a quantized or unquantized value is transmitted from the encoder. The difference may be delivered per point or encoded per point group, using an entropy encoding method such as Exponential Golomb, Context-Adaptive Variable Length Coding, Context-Adaptive Binary Arithmetic Coding, or the like. The difference may be transformed to a bitstream after a transform operation such as DCT, DST, DST, SADCT, or RAHT is performed.

Based on the geometry of the current frame and the previous frame (reference frame), three candidates (predInter1, predInter2, and predInter3) in the current frame and two candidates (predInter1 and predInter2) in the reference frame may be considered.

The eligible value in the equation according to embodiments may be used to select a mode to determine whether to consider intra-frame reflectance or inter-frame reflectance.

PredEligible itself is a reflectance, and a residual may be generated from the difference from the reflectance of the current point. The mode that produces the smallest residual may be the inter-mode or intra-mode, and one of these modes may be selected.

Once the encoder has selected the mode and compressed the attributes, the decoder may check the above value and reconstruct the attributes based on the intra-reflectance. When the value is eligible, the point cloud may be reconstructed by applying a weight to the inter-reflectance.

FIG. 18 illustrates a point cloud data transmission device according to embodiments.

FIG. 18 illustrates a device related to the point cloud data transmission method/device according to the embodiments (the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the devices of FIG. 14, the predictive tree-based encoding of FIG. 15, the inter-frame predictive tree-based compression of FIG. 16, the compression based on sorting by azimuth according to laser ID of FIG. 17, the intra-frame and/or inter-frame encoders of FIG. 18, the bitstream generation of FIGS. 20 to 23, and the transmission method of FIG. 24).

The device in FIG. 18 is an intra-/inter-frame attribute encoder using the laserID of a predictive tree.

The attribute compressor may generate information (laserID_use_predtree_flag) indicating whether to use attribute compression coding based on the laserID of a predictive tree as signaling information and deliver the same. Based on the information indicating whether to use attribute compression coding based on the laserID, a transformation necessary for attribute compression may be performed.

Regarding the intra-/inter-frame mode suitability, a weight may be assigned to selection of inter-frame compression. The weight value may be generated and signaled as prediction weight information (pred_weight). The mode may be selected to use inter-frame coding when the weighted predicted value is greater than or equal to a threshold. The threshold may be predictor_inter_intra_threshold information to the decoder.

Referring to FIG. 18, the transmission device according to the embodiments may be referred to as an encoder, and may include a memory and/or a processor. Instructions stored in the memory may be configured to cause the processor to encode the point cloud data. Each component of FIG. 18 may correspond to hardware, software, a processor, and/or a combination thereof.

The data input unit may acquire point cloud data. The point cloud data may be received as input by the acquisition part, a camera, a sensor, or the like. The point cloud data may be referred to as a point cloud.

The coordinate transformer may transform coordinates of geometries in the point cloud. For example, coordinates related to the position values of the points in the reference frame and/or the position values of the points in the current frame may be transformed.

The quantization/voxelization processor may quantize and/or voxelize the point cloud.

The predictive tree generator may present the point cloud in a predictive tree structure. It may generate a predictive tree representing a parent/child relationship between geometries (points) in the point cloud.

The predictive tree encoder may encode the point cloud based on the predictive tree. It may generate a predicted value for the current point based on the predictive tree. It may generate a residual between the current point and the predicted value.

The arithmetic coder may encode the residual and generate a geometry bitstream.

The reference and/or current frame geometry reconstructor may reconstruct the encoded points to provide the geometry information about the points needed for attribute compression. The geometry may be reconstructed using points contained in the current frame and/or reference frame.

The color transform processor may transform attributes (colors) of the point cloud. It may transform the color system. It may receive as input the attribute values of points in the reference frame and/or the attribute values of points in the current frame.

The attribute transform processor may transform attributes. Based on the reconstructed geometry, the attributes corresponding to the geometry may be transformed to a suitable system for encoding the attributes.

The laser ID-based predictor generator may generate a predictor of the point cloud based on laser IDs related to the point cloud. For details, refer to the description of FIG. 17 and the like.

The intra-frame and/or inter-frame mode suitability checker may check the intra-frame and/or inter-frame mode suitability and select a suitable mode. For details, refer to the description of FIG. 17 and the like.

The arithmetic coder may encode the residual between an attribute of the current point cloud and the predicted value, and generate an attribute bitstream.

FIG. 19 illustrates a point cloud data reception device according to embodiments.

FIG. 19 illustrates a device related to the point cloud data reception method/device according to the embodiments (the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the devices of FIG. 14, the predictive tree-based decoding of FIG. 15, the inter-frame predictive tree-based reconstruction of FIG. 16, the reconstruction based on sorting by azimuth according to laser ID of FIG. 17, the intra-frame and/or inter-frame decoders of FIG. 19, the bitstream parsing of FIGS. 20 to 23, and the reception method of FIG. 25).

FIG. 19 illustrates an intra-/inter-frame attribute decoder using the laserID of a predictive tree.

Prior to attribute decoding, laserID_use_predtree_flag may be received as parameter information contained in the received bitstream. A predictor may be generated based on the laserID in the same manner as in the encoder.

Based on pred_weight delivered from the encoder, a weight may be applied to the intra-/inter-frame predictor. When the weighted predicted value is greater than or equal to a threshold, the mode is decoded to use inter-frame coding. The threshold is received as predictor_inter_intra_threshold and is used in computing the reconstructed mode and the difference reconstruction.

Referring to FIG. 19, the reception device according to the embodiments may be referred to as a decoder and may include a memory and/or a processor. Instructions stored in the memory may be configured to cause the processor to decode the point cloud data. Each component of FIG. 19 may correspond to hardware, software, a processor, and/or a combination thereof.

The receiver may receive a bitstream containing a point cloud and parameters. The bitstream may include a geometry bitstream and/or an attribute bitstream. The decoder may decode the geometry and/or attributes contained in the bitstream based on the parameters contained in the bitstream.

The operation of the decoder may correspond to the operation of the encoder, and may reconstruct the point cloud according to the reverse process to the operation of the encoder.

The arithmetic decoder may decode the geometry contained in the geometry bitstream.

The predictive tree-based reconstruction processor may reconstruct the point cloud based on the predictive tree. A predictive tree for the point cloud may be generated in the same manner as in the encoder.

The surface model processor may triangulate, up-sample, and/or voxelize a surface model of the geometry.

The reference and/or current frame geometry reconstructor may reconstruct the geometry needed to decode attributes. It may reconstruct the geometry based on the reference frame and/or the current frame.

The coordinate inverse transformer may inversely transform the coordinates of the geometry to generate position values of the points in the current frame. A Cartesian coordinate system may be used to generate position values of the points.

The arithmetic decoder may receive an attribute bitstream and decode the attributes contained in the bitstream.

The inverse quantization processor may inversely quantize the attributes.

The laser ID-based predictor generator may generate a predictor for the attribute based on the laser ID. The predictor may be used to decode the attribute. For details, refer to the description of FIG. 17 and the like.

The intra-frame and/or inter-frame mode and difference calculator may select an intra-frame and/or inter-frame mode and calculate a difference. For details, refer to the description of FIG. 17 and the like.

The color inverse transform processor may inversely transform colors (attributes). For example, it may generate the attribute values of the points having RGB in the current frame.

Figure 20:
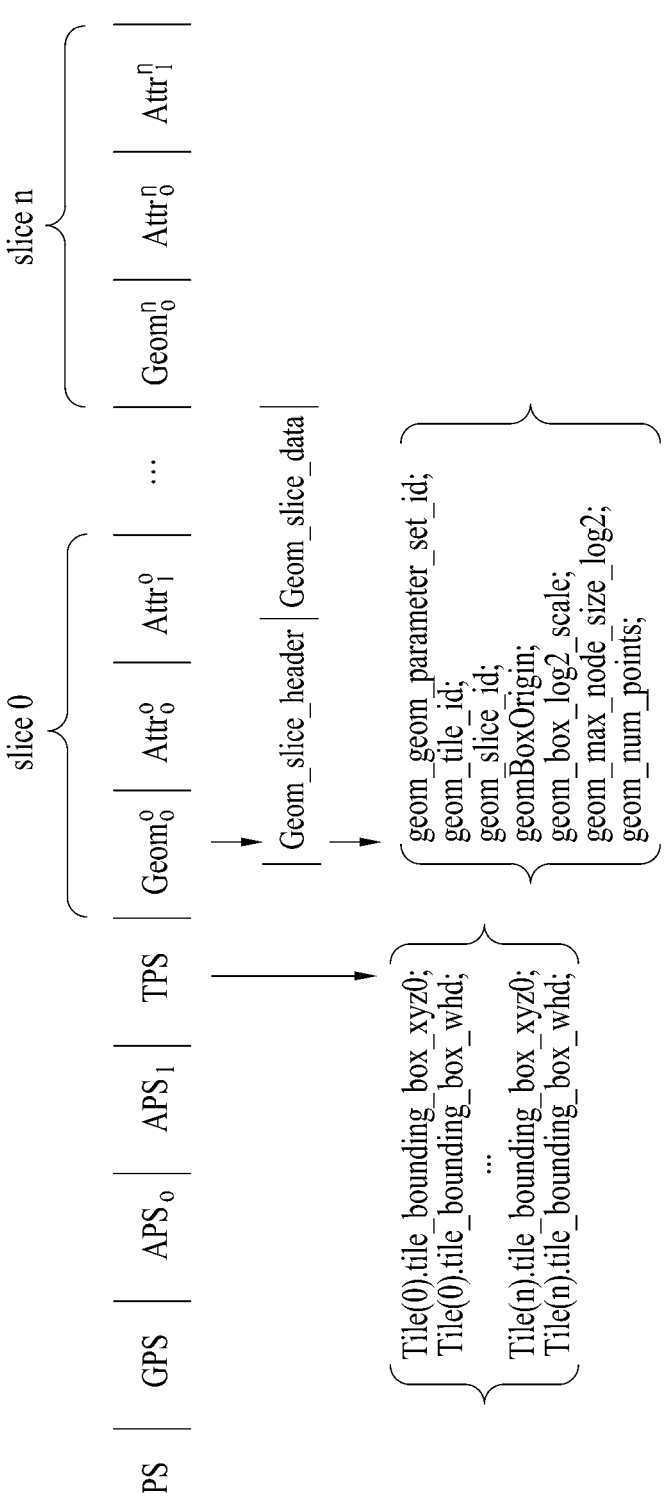
FIG. 20 illustrates a bitstream containing a point cloud and parameters according to embodiments.

FIG. 20 illustrates a bitstream containing a point cloud and parameters according to embodiments.

The bitstream in FIG. 20 is generated by the point cloud data transmission method/device according to the embodiments (the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the devices of FIG. 14, the predictive tree-based encoding of FIG. 15, the inter-frame predictive tree-based compression of FIG. 16, the compression based on sorting by azimuth according to laser ID of FIG. 17, the intra-frame and/or inter-frame encoders of FIG. 18, the bitstream generation of FIGS. 20 to 23, and the transmission method of FIG. 24).

The bitstream in FIG. 20 is decoded by the point cloud data reception method/device according to the embodiments (the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the devices of FIG. 14, the predictive tree-based decoding of FIG. 15, the inter-frame predictive tree-based reconstruction of FIG. 16, the reconstruction based on sorting by azimuth according to laser ID of FIG. 17, the intra-frame and/or inter-frame decoders of FIG. 19, the bitstream parsing of FIGS. 20 to 23, and the reception method of FIG. 25).

To add/carry out the intra-/inter-frame attribute encoding/decoding method using the laserID of the predictive tree, the encoder may generate parameters and transmit the same to the decoder as signaling information. The decoder performs decoding based on the parameters.

Hereinafter, parameters (which may be referred to as metadata, signaling information, etc.) according to embodiments may be generated in a process of a transmitter according to embodiments described below, and delivered to a receiver according to embodiments for use in a reconstruction process. For example, the parameters according to the embodiments may be generated in a metadata processor (or metadata generator) of the transmission device according to the embodiments described below and acquired by a metadata parser of the reception device according to the embodiments described below. The encoded point cloud is configured as follows.

Each abbreviation stands for the following. SPS: Sequence Parameter Set, GPS: Geometry Parameter Set, APS: Attribute Parameter Set, TPS: Tile Parameter Set, Geom: Geometry bitstream=geometry slice header+geometry slice data, Attr: Attribute bitstream=attribute brick header+attribute brick data. A brick may be referred to as a slice.

A bitstream contains parameter sets and contains slices, which are units of encoding/decoding. There are geometry data and attribute data per slice. The geometry/attribute data may include a header and data, respectively. The header may contain auxiliary information for the data.

The parameter sets may include a sequence parameter set, a geometry parameter set, an attribute parameter set, and a tile parameter set. The tile parameter set may contain information about a plurality of tiles. For example, it may contain the coordinates, width, height, and depth of the bounding box for tile 0, and the coordinates, width, height, and depth of the bounding box for tile n. There may be a different parameter set for each type of attribute. A slice may contain one geometry and/or zero or one or more attributes. The geometry may be composed of a slice header and slice data. The geometry slice header may contain information about the geometry. For example, it may contain a geometry parameter set ID related to the geometry, tile ID, slice ID, position/size information about the bounding box, and information about the number of points.

Tiles or slices are provided such that the point cloud may be divided into regions and processed.

When the point cloud is divided into regions, each region may have a different importance.

By providing regions such that different filters or different filter units may be applied according to the importance, a filtering method having high complexity but proving a good quality of the result may be used in an important region.

By applying different filtering to the respective regions (regions partitioned into tiles or slices) according to the receiver capacity, rather than applying a complex filtering method to the entire point cloud data, better image quality may be ensured in a region important to the user and an appropriate latency may be ensured for the system.

Accordingly, when a point cloud is partitioned into tiles, different filters or different filter units may be applied to the respective tiles.

When the point cloud is divided into slices, different filters or different filter units may be applied to the respective slices.

Hereafter, the syntax of the parameters contained in the bitstream is described with reference to the respective drawings.

FIG. 21 illustrates a sequence parameter set according to embodiments.

The SPS of FIG. 21 contained in the bitstream of FIG. 20 may carry information about the structure of attribute encoding based on the laserID of the predictive tree.

laserID_use_predtree_flag indicates whether to use the laserID to generate a predictor. For example, the flag set to TRUE indicates that the laserID is used to generate an attribute predictor, while the flag set to FALSE indicates that the laserID is not used to generate an attribute predictor.

pred_weight indicates the coefficient for weighting the intra-/inter-frame predictor.

predictor_inter_intra_threshold indicates the threshold for a calculated weight. For example, pred_weight may be used to generate an intra-frame and/or inter-frame predictor. When the weighted predictor is greater than or equal to the threshold, only the inter-frame predictor may be used. A difference value (residual) may be generated through the predictor generation mode according to the signaled method.

The SPS may further contain the following elements.

simple_profile_compatible indicates whether the bitstream is compatible with a simple profile (when equal to 1) or not (when equal to 0).

dense_profile_compliance indicates whether the bitstream is compliant with a dense profile (when equal to 1) or not (when equal to 0).

predictive_profile_compliance indicates whether the bitstream is compliant with the predictive profile (when equal to 1) or not (when equal to 0).

main_profile_compliant indicates whether the bitstream is compliant with the main profile (when equal to 1) or not (when equal to 0).

slice_reordering_constraint indicates whether the bitstream is sensitive to reordering or removal of slices within the coded point cloud frame (when equal to 1) or not (when equal to 0).

unique_point_positions_constraint equal to 1 indicates that every point should have a unique position in each coded point cloud frame. unique_point_positions_constraint equal to 0 indicates that two or more points may have the same position in a coded point cloud frame.

sps_seq_parameter_set_id identifies the SPS for reference by other DUs.

seq_origin_bits specifies the length in bits of each syntax element seq_origin_xyz, excluding all sign bits.

seq_origin_xyz[k] and seq_origin_log 2_scale together specify the XYZ origin of the sequence and coding coordinates per sequence coordinate system unit from the application-specific coordinate origin.

seq_bbox_size_bits indicates the length in bits of each syntax element seq_bbox_size_minus1_xyz.

seq_bbox_size_minus1_xyz[k]+1 indicates the k-th XYZ component of the coded volume dimension in the sequence coordinate system, seq_unit_denominator_minus1, and seq_unit_is_metres together indicate the length represented by the unit vectors in the sequence coordinate system.

geom_axis_order indicates the correspondence between the XYZ axes and the STV axes of the coded point cloud according to Table 8.

num_attributes indicates the number of attributes enumerated in the SPS attribute list.

attr_components_minus1[attrIdx]+1 indicates the number of components of the identified attribute.

attr_instance_id[attrIdx] indicates the instance identifier of the identified attribute.

attr_bitdepth_minus1[attrIdx]+1 indicates the bit depth of all components of the identified attribute.

attr_label_known[attrIdx], attr_label[attrIdx], and attr_label_oid[attrIdx] together identify the type of data carried by the identified attribute. attr_label_known[attrIdx] indicates whether the attribute is an attribute specified in this document by the value attr_label[attrIdx] or (when equal to 0) or an externally specified attribute identified by the object identifier attr_label_oid[attrIdx].

attr_property_cnt indicates the number of attribute_property syntax structures in the SPS for the attribute.

FIG. 22 illustrates a tile parameter set according to embodiments.

The TPS of FIG. 22 contained in the bitstream of FIG. 20 may carry information about the structure of attribute encoding based on the laserID of the predictive tree.

laserID_use_predtree_flag indicates whether to use the laserID to generate a predictor. For example, the flag set to TRUE indicates that the laserID is used to generate an attribute predictor, while the flag set to FALSE indicates that the laserID is not used to generate an attribute predictor.

pred_weight indicates the coefficient for weighting the intra-/inter-frame predictor.

predictor_inter_intra_threshold indicates the threshold for a calculated weight. For example, pred_weight may be used to generate an intra-frame and/or inter-frame predictor. When the weighted predictor is greater than or equal to the threshold, only the inter-frame predictor may be used. A difference value (residual) may be generated through the predictor generation mode according to the signaled method.

The TPS may be referred to as a tile inventory data unit. The TPS may further contain the following elements.

The tile inventory (if any) contains metadata that defines the spatial area of each enumerated tile. Each tile is identified by an implicit or explicit tile ID.

The tile inventory is applied in the next coded point cloud frame that follows the tile inventory data unit.

ti_seq_parameter_set_id identifies the active SPS with sps_seq_parameter_set_id.

tile_cnt indicates the number of tiles enumerated in the tile inventory.

tile_id_bits specifies the length of each syntax element tile_id in bits. tile_id_bits equal to 0 indicates that the tile should be identified by index tileIdx.

tile_origin_bits_minus1+1 indicates the length in bits of each syntax element tile_origin_xyz, excluding all sign bits.

tile_size_bits_minus1+1 indicates the length in bits of each syntax element tile_size_minus1_xyz.

tile_id[tileIdx] indicates the identifier of the tileIdx-th tile in the tile inventory.

tile_origin_xyz[tileId][k] and tile_size_minus1_xyz[tileId][k] indicate the bounding box in the sequence coordinate system containing the slice identified by slice_tag equal to tileId.

tile_origin_xyz[tileId][k] indicates the k-th XYZ coordinate of the bottom corner of the tile bounding box with respect to the tile inventory origin.

tile_size_minus1_xyz[tileId][k]+1 indicates the k-th XYZ dimension of the tile bounding box.

ti_origin_xyz[k] and ti_origin_log 2_scale together indicate the XYZ origin of the sequence coordinate system specified by seq_origin_xyz[k] and seq_origin_log 2_scale.

FIG. 23 illustrates a geometry parameter set, an attribute parameter set, and a geometry slice header according to embodiments.

The GPS of FIG. 23 contained in the bitstream of FIG. 20 may carry information about the structure of attribute encoding based on the laserID of the predictive tree.

laserID_use_predtree_flag indicates whether to use the laserID to generate a predictor. For example, the flag set to TRUE indicates that the laserID is used to generate an attribute predictor, while the flag set to FALSE indicates that the laserID is not used to generate an attribute predictor.

pred_weight indicates the coefficient for weighting the intra-/inter-frame predictor.

predictor_inter_intra_threshold indicates the threshold for a calculated weight. For example, pred_weight may be used to generate an intra-frame and/or inter-frame predictor. When the weighted predictor is greater than or equal to the threshold, only the inter-frame predictor may be used. A difference value (residual) may be generated through the predictor generation mode according to the signaled method.

The GPS may further contain the following elements.

gps_geom_parameter_set_id identifies the GPS for reference by other DUs.

gps_seq_parameter_set_id identifies the active SPS with sps_seq_parameter_set_id.

slice_geom_origin_scale_present indicates whether slice_geom_origin_log 2_scale is present in the GDU header (when equal to 1) or not (when equal to 0). slice_geom_origin_scale_present equal to 0 indicates that the slice origin scale is specified by gps_geom_origin_log 2_scale.

gps_geom_origin_log 2_scale indicates the scale factor used to derive the slice origin from slice_geom_origin_xyz when slice_geom_origin_scale_present is equal to 0.

geom_tree_type equal to 0 indicates that the slice geometry is coded using an occupancy tree (7.3.3.4). geom_tree_type equal to 1 indicates that the slice geometry is coded using a predictive tree (7.3.3.8).

geom_angular_enabled indicates that slice geometry is coded based on information about a beam set positioned and rotated along the V axis of the angle origin (when equal to 1) or not (when equal to 0).

slice_angular_origin_present indicates whether the slice-related angular origin is signaled in the GDU header (when equal to 1) or not (when equal to 0). slice_angular_origin_present equal to 0 indicates that the angular origin is gps_angular_origin_xyz.

gps_angular_origin_xyz[k] indicates the -th XYZ coordinate of the angular origin in the coding coordinate system.

num_beams_minus1+1 indicates the number of beams enumerated in the GPS.

beam_elevation_init and beam_elevation_diff[i] together indicate the beam elevation with gradation above the S-T plane.

beam_voffset_init and beam_voffset_diff[i] together indicate the V-axis offset of the enumerated beams from the angular origin. The offset is specified in units of the coding coordinate system. The offset for the i-th beam is specified by the expression BeamOffsetV[i].

beam_steps_per_rotation_init_minus1 and beam_steps_per_rotation_diff[i] indicate the number of steps taken per rotation by the rotating beam.

ptree_ang_radius_scale_log 2 indicates the factor used to scale the radial angular coordinates of a point during the transformation to Cartesian coordinates.

ptree_ang_azimuth_step_minus1+1 indicates the expected change in azimuth of the rotating beam between coded points.

occtree_direct_joint_coding_enabled indicates whether a direct node for coding two points should jointly code positions according to a specific ordering of the points (when equal to 1) or not (when equal to 0).

occtree_coded_axis_list_present equal to 1 indicates that the GDU header contains the syntax element occtree_coded_axis, which is used to derive the node size for each occupancy tree level. occtree_coded_axis_list_present equal to 0 indicates that the syntax element occtree_coded_axis is not present in the GDU syntax and that the occupancy tree indicates a cubic volume specified by the tree depth.

occtree_neigh_window_log 2_minus1+1 indicates the number of occupancy tree node positions that form each availability window within the tree level.

occtree_adjacent_child_enabled indicates whether the adjacent child of a neighbor occupancy tree node is used for bit occupancy contextualization (when equal to 1) or not (when equal to 0).

occtree_intra_pred_max_nodesize_log 2–1 indicates the maximum size of occupancy tree nodes suitable for in-slice occupancy prediction.

occtree_bitwise_coding indicates that the node occupancy bitmap is coded using a syntax element occupancy_bit (when equal to 1) or using a pre-coded syntax element occupancy byte (when equal to 0).

occtree_planar_enabled indicates that the coding of the node occupancy bitmap is partially performed by signaling of occupied and unoccupied planes (when equal to 1) or not (when equal to 0).

occtree_planar_threshold[i] indicates the threshold used in part to determine axis-specific suitability for planar occupancy coding.

Presence of occtree_direct_node_rate_minus1 indicates that for every 32 eligible nodes, only occtree_direct_node_rate_minus1+1 nodes may be coded as direct nodes.

occtree_planar_buffer_disabled indicates whether to disable contextualization of occupied planar positions per node using the planar positions of the previously coded nodes (when equal to 1) or not (when equal to 0).

geom_scaling_enabled indicates that the coded geometry should be scaled (when equal to 1) or not (when equal to 0) in the geometry decoding process.

geom_qp indicates the geometry QP before adding an offset per slice and per node.

occtree_direct_node_qp_offset indicates the offset relative to the slice geometry QP for scaling direct node coded point positions.

The APS may carry information about the structure of attribute encoding based on the laserID of the predictive tree.

laserID_use_predtree_flag indicates whether to use the laserID to generate a predictor. For example, the flag set to TRUE indicates that the laserID is used to generate an attribute predictor, while the flag set to FALSE indicates that the laserID is not used to generate an attribute predictor.

pred_weight indicates the coefficient for weighting the intra-/inter-frame predictor.

predictor_inter_intra_threshold indicates the threshold for a calculated weight. For example, pred_weight may be used to generate an intra-frame and/or inter-frame predictor. When the weighted predictor is greater than or equal to the threshold, only the inter-frame predictor may be used. A difference value (residual) may be generated through the predictor generation mode according to the signaled method.

The ASP of FIG. 23 contained in the bitstream of FIG. 20 may further contain the following elements aps_attr_parameter_set_id identifies the APS to be referenced by other DUs.

aps_seq_parameter_set_id identifies the active SPS based on sps_seq_parameter_set_id.

attr_coding_type indicates an attribute coding method.

attr_secondary_qp_offset indicates the offset to be applied to the primary attribute QP to derive the QP for the secondary attribute component.

attr_qp_offsets_present indicates whether the per-slice attribute QP offset, attr_qp_offset[c], is present in the ADU header (when equal to 1) or not (when equal to 0).

attr_coord_conv_enabled indicates whether attribute coding uses scaled angular coordinates (when equal to 1) or slice-related STV point positions (when equal to 0).

attr_coord_conv_scale[k] indicates the scale factor used to scale the k-th angular coordinate of a point for attribute coding.

raht_prediction_enabled indicates whether that the RAHT coefficients are predicted by upsampling and converting the previous coarse conversion level (when equal to 1) or not (when equal to 0).

pred_set_size_minus1+1 indicates the maximum size of the predictor set per point.

pred_inter_lod_search_range indicates the index range around the search center in which search may be performed in the extended inter-lod search for the nearest neighbor to include in the predictor set of a point.

pred_dist_bias_minus1_xyz[k]+1 indicates the factor used to weight the k-th XYZ component of the distance vector between two point positions used to calculate the distance between points in the predictor search for a single refinement point.

pred_max_range_minus1+1 indicates the distance at which point predictor candidates should be discarded during predictor set pruning for scalable attribute coding.

lod_max_levels_minus1+1 indicates the maximum number of levels of detail that may be generated by the LoD generation process.

lod_decimation_mode indicates the decimation method used to generate levels of detail.

lod_sampling_period_minus2[lvl]+2 indicates the sampling period used in LoD generation for sampling points at level of detail lvl to generate the next low level of detail lvl+1.

lod_initial_dist_log 2 indicates the block size at the finest level of detail for use in LoD generation and predictor search.

lod_dist_log 2_offset_present indicates whether the per-slice block size offset specified by lod_dist_log 2_offset should be present in the ADU header (when equal to 1) or not (when equal to 0).

pred_direct_max_idx_plus1 indicates the maximum number of single point predictors that may be used for direct prediction.

pred_direct_threshold indicates when a point is suitable for direct prediction.

pred_direct avg_disabled indicates whether the point predictor set averaging is in direct prediction mode (when equal to 0) or not (when equal to 1).

pred_intra_lod_search_range indicates the range of indexes in the refinement list of the LoD at which the nearest neighbors to be included in the predictor set of the points have been searched for.

pred_intra_min_lod indicates the finest level of detail at which intra-detail level prediction is enabled.

inter_comp_pred_enabled indicates whether the first component of a multi-component attribute coefficient should be used to predict the coefficients of subsequent components (when equal to 1) or not (when equal to 0).

pred_blending_enabled indicates that a neighbor weight used for predicting the neighbor average should be blended based on the relative spatial position of the points involved (when equal to 1) or not (when equal to 0).

raw_attr_width_present indicates that raw attribute values should use the same fixed-length encoding for all syntax elements (when equal to 0) or that raw attribute values should use a length per syntax element (when equal to 1).

The slice header in Geom may carry information about the structure of attribute encoding based on the laserID of the predictive tree.

laserID_use_predtree_flag indicates whether to use the laserID to generate a predictor. For example, the flag set to TRUE indicates that the laserID is used to generate an attribute predictor, while the flag set to FALSE indicates that the laserID is not used to generate an attribute predictor.

pred_weight indicates the coefficient for weighting the intra-/inter-frame predictor.

predictor_inter_intra_threshold indicates the threshold for a calculated weight. For example, pred_weight may be used to generate an intra-frame and/or inter-frame predictor. When the weighted predictor is greater than or equal to the threshold, only the inter-frame predictor may be used. A difference value (residual) may be generated through the predictor generation mode according to the signaled method.

The geometry slice header of FIG. 23 contained in the bitstream of FIG. 20 may be referred to as a geometry data unit header, and may further contain the following elements.

The GDU of FIG. 23 contained in the bitstream of FIG. 20 carries related slice information such as the structure of the slice and a frame counter or slice origin. The GDU is composed of a GDU header, geometry coded using an occupancy tree (when geom_tree_type is equal to 0) or a predictive tree (when geom_tree_type is equal to 1), and a GDU footer.

gdu_geometry_parameter_set_id indicates the active GPS with gps_geom_parameter_set_id.

slice_id identifies the slice for reference by other DUs.

slice_tag identifies a slice as a member of a group of slices that have the same value for slice_tag.

slice_entropy_continuation equal to 1 indicates that the entropy syntax analysis state restoration process (11.6.2.2 and 11.6.3.2) shall be applied at the start of the GDU and the ADUs of the slice. slice_entropy_continuation equal to 0 specifies that the syntax analysis of the GDU and ADUs of the slice is independent of that of the other slices.

slice_geom_origin_bits_minus1+1 indicates the length in bits of each syntax element slice_geom_origin_xyz.

slice_geom_origin_xyz[k] and slice_geom_origin_log 2_scale indicate the k-th XYZ coordinate of the slice origin in the coding coordinate system.

slice_angular_origin_bits_minus1+1 indicates the length in bits of each shintax element slice_angular_origin_xyz.

slice_angular_origin_xyz[k] indicates the k-th XYZ coordinate of the relative angular origin in the coordinate system of the slice slice_geom_qp_offset indicates the slice geometry QP as an offset to the GPS geom_qp.

FIG. 24 illustrates a method of transmitting point cloud data according to embodiments.

FIG. 25 illustrates a method to executing the point cloud data transmission method/device according to the embodiments (the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the devices of FIG. 14, the predictive tree-based encoding of FIG. 15, the inter-frame predictive tree-based compression of FIG. 16, the compression based on sorting by azimuth according to laser ID of FIG. 17, the intra-frame and/or inter-frame encoders of FIG. 18, and the bitstream generation of FIGS. 20 to 23).

S2400: The method of transmitting point cloud data according to the embodiments, may include encoding point cloud data.

In the encoding operation according to the embodiments, the point cloud data may be encoded according to FIGS. 1 to 14. Further, the encoding operation according to the embodiments may include generating a predictor based the laser ID in encoding the attributes, as shown in FIGS. 15 to 18. A predictor may be generated from a reference frame and/or the current frame based on the laser ID. The encoding operation according to the embodiments may include selecting a predictor from among predictor candidates for the reference frame and/or the current frame, and determining the predictor by weighting and/or comparison to perform predictive coding. Based on the determined predictor, predictive coding may be performed to encode and transmit a residual.

S2410: The method of transmitting point cloud data according to the embodiments may further include transmitting a bitstream containing the point cloud data.

The transmitting operation according to the embodiments may include encoding the point cloud data according to FIGS. 1 to 14 and FIGS. 15 to 18, and generating and transmitting the bitstream as shown in FIGS. 20 to 23.

FIG. 25 illustrates a method of receiving point cloud data according to embodiments.

FIG. 25 illustrates a method to execute the point cloud data reception method/device according to the embodiments (the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the devices of FIG. 14, the predictive tree-based decoding of FIG. 15, the inter-frame predictive tree-based reconstruction of FIG. 16, the reconstruction based on sorting by azimuth according to laser ID of FIG. 17, the intra-frame and/or inter-frame decoders of FIG. 19, and the bitstream parsing of FIGS. 20 to 23).

S2500: The method of receiving point cloud data according to the embodiments may include receiving a bitstream containing point cloud data.

In the receiving operation according to the embodiments, a bitstream such as the bitstream shown in FIGS. 20 to 23 may be received.

S2510: The method of receiving point cloud data according to the embodiments may further include decoding the point cloud data.

The decoding operation according to the embodiments may include decoding a geometry bitstream and an attribute bitstream contained in the point cloud data, as illustrated in FIGS. 1 to 14. Further, the point cloud data may be decoded based on a laser ID, according to FIGS. 15 to 19. During attribute decoding, a predictor may be generated based on the laser ID. A predictor may be generated from a reference frame and/or a current frame based on the laser ID. The encoding operation according to the embodiments may include selecting a predictor from among predictor candidates for the reference frame and/or the current frame, and determining the predictor by weighting and/or comparison to perform predictive coding. Based on the determined predictor, predictive coding may be performed to generate a residual, which may be summed with the received residual to reconstruct the point cloud data.

Referring to FIG. 1, a method of transmitting point cloud data may include encoding the point cloud data, and transmitting a bitstream containing the point cloud data.

Referring to FIGS. 15 and 16, regarding predictive tree-based geometry compression, the encoding of the point cloud data may include encoding the point cloud data based on a predictive tree, wherein the point cloud data may be predicted based on points contained in a reference frame for a current frame containing the point cloud data. The predictive tree of the point cloud data may be used to predict geometry of the points and/or an attribute of the points. Predictor candidates for use as the predictors may be generated, and a predictor with the most similar value to the geometry of the current point and/or the attribute of the current point may be selected.

Referring to FIG. 17, regarding the method of selecting a predictor node in a reference frame based on laserID, the encoding of the point cloud data may include sorting the points in the point cloud data based on an azimuth according to the laserID. Points contained in a current frame containing the point cloud data and a reference frame for the current frame may be sorted based on the laser ID and the azimuth, and a predictor for the points in the current frame may be selected from the sorted points in the current frame and the reference frame. For example, the points may be sorted in an ascending order of the laser ID. Points belonging to a laser ID may be sorted in an ascending order of the azimuth. The encoding of the point cloud data may include encoding an attribute of the point cloud data, wherein the attribute may be predicted based on an attribute and a weight contained in the reference frame. The attribute may include reflectance. From the points sorted according to the laser ID and the azimuth, a point having a similar reflectance to the current point may be selected as a predictor for the current point. An efficient prediction mode may be selected between intra-frame prediction and/or inter-frame prediction. Regarding predEligible_reflectance, based on that a value generated based on an attribute for the current frame, an attribute for the reference frame, and the weight is greater than or equal to a threshold, the attribute may be predicted based on the attribute for the reference frame. Based on that the value generated based on the attribute for the current frame, the attribute for the reference frame, and the weight is less than the threshold, the attribute is predicted based on the attribute for the current frame. The cases based on the threshold may be reversed.

Referring to FIGS. 20 to 23, regarding the signaling information (laserID_use_predtree_flag, pred_weight, and predictor_inter_intra_threshold), the bitstream may contain information indicating whether to generate a predictor based on the laser ID, information indicating the weight, and information indicating the threshold.

The method of transmitting the point cloud data may be carried out by a transmission device. The transmission device may include an encoder configured to encode point cloud data, and a transmitter configured to transmit a bitstream containing the point cloud data. The transmission device, as an encoder, may include a memory storing an encoding operation, and a processor connected to the memory, wherein the operation may cause the processor to perform the encoding operation.

The reception method may correspond to the transmission method and may include a reverse process. The reception method may include: receiving a bitstream containing point cloud data; and decoding the point cloud data. Referring to FIG. 19, the decoding of the point cloud data may include decoding the point cloud data based on a predictive tree, wherein the point cloud data may be predicted based on points contained in a reference frame for a current frame containing the point cloud data. The decoding of the point cloud data may include sorting points of the point cloud data based on an azimuth according to a laser ID. Points contained in a current frame containing the point cloud data and a reference frame for the current frame may be sorted based on the laser ID and the azimuth, and a predictor for the points in the current frame may be selected from the sorted points in the current frame and the reference frame. The decoding of the point cloud data may include decoding an attribute of the point cloud data, wherein the attribute may be predicted based on an attribute and a weight contained in the reference frame. Based on that a value generated based on an attribute for the current frame, an attribute for the reference frame, and the weight is greater than or equal to a threshold, the attribute may be predicted based on the attribute for the reference frame. Based on that the value generated based on the attribute for the current frame, the attribute for the reference frame, and the weight is less than the threshold, the attribute may be predicted based on the attribute for the current frame. For example, the points may be sorted in an ascending order of the laser ID. Points belonging to a laser ID may be sorted in an ascending order of the azimuth. The attribute may include reflectance. From the points sorted according to the laser ID and the azimuth, a point having a similar reflectance to the current point may be selected as a predictor for the current point. An efficient prediction mode may be selected between intra-frame prediction and/or inter-frame prediction. The cases based on the threshold may be reversed.

The method of receiving point cloud data may be carried out by a reception device. The reception device may include a receiver configured to receive a bitstream containing point cloud data, and a decoder configured to decode the point cloud data. The reception device, as a decoder, may include a memory storing a decoding operation and a processor connected to the memory, wherein operation may cause the processor to perform the decoding operation. Based on the parameters contained in the bitstream, the geometry and attribute for the points in the point cloud may be reconstructed. A predictive tree may be generated to predict the geometry and attribute of the current point based on the predictive tree and sum the same to the residual received in the bitstream and decoded to reconstruct the geometry and attribute of the point.

As a result, embodiments may provide inter-frame coding to increase the compression efficiency of attribute coding during point cloud compression. Instead of using the conventional Morton-based sorting, azimuth-based sorting may be performed based on the characteristics of the point cloud—only one point is acquired by one laser—and only the information needed for attribute compression may be utilized. Thus, the amount of computation and time spent on unnecessary coordinate transformations and Morton-based sorting may be effectively reduced. The compression efficiency may be improved by searching for the correct attribute values in the inter-frame information. Points may be compressed and reconstructed using a predictive tree for inter-frame prediction, and a predictive tree technique may be applied to both geometry and/or attributes. By sorting points according to laser ID and/or azimuth, point similarity may be further reflected, thereby efficiently finding similar points and increasing compression/reconstruction performance. In addition, by considering both the inter-frame and the intra-frame, the most efficient mode may be effectively selected between inter-mode and intra-mode based on point characteristics. The geometry coding using a predictive tree enables low-latency coding when the proposed geometry attribute coding method is used in the frame, but low-latency operation is not possible in the attribute compression. Accordingly, practical low-latency coding is not possible. In addition, the proposed method may improve attribute compression performance by further providing a method of selecting a predictor node in a reference frame based on laserID and a method of determining compression based on an inter-frame/intra-frame predictor node set. According to embodiments, inter-frame coding may be performed to improve the compression efficiency of attribute coding during the point cloud compression. Instead of using the conventional Morton-based sorting, azimuth-based sorting may be performed based on the characteristics of the point cloud—only one point is acquired by one laser—and only the information needed for attribute compression may be utilized. Thus, the amount of computation and time spent on unnecessary coordinate transformations and Morton-based sorting may be effectively reduced. Further, the compression efficiency may be improved by searching for the correct attribute values in the inter-frame information.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method comprising:
generating information related to that point cloud data in a frame is encoded based on an inter-prediction for a laser identifier;
encoding geometry data of the point cloud data; and
encoding attribute data of the point cloud data, wherein the encoding the attribute data includes:
searching a predictor for the attribute data based on a weight,
wherein the weight for the predictor is generated based on attribute data of a reference frame for the frame.

2. The method of claim 1, wherein the encoding of the point cloud data comprises:
encoding the point cloud data based on a predictive tree, wherein the point cloud data is predicted based on points in the reference.

3. The method of claim 1, wherein the encoding of the point cloud data comprises:
sorting points of the point cloud data based on an azimuth according to a laser ID.

4. The method of claim 3, wherein points in the frame containing the point cloud data and the reference frame are sorted based on the laser ID and the azimuth,
wherein a predictor for the points in the frame is selected from the sorted points in the frame and the reference frame.

5. The method of claim 4, based on that a value generated based on an attribute for the frame, an attribute for the reference frame, and the weight is greater than or equal to a threshold, the attribute is predicted based on the attribute for the reference frame,
wherein, based on that the value generated based on the attribute for the frame, the attribute for the reference frame, and the weight is less than the threshold, the attribute is predicted based on the attribute for the frame.

6. The method of claim 5, further comprising generating a bitstream that contains information indicating the weight, and information indicating the threshold.

7. A method comprising:
obtaining information for representing whether attribute data of point cloud data in a frame is predicted for an inter-prediction based on a laser identifier;
decoding geometry data of the point cloud data; and
decoding attribute data of the point cloud data, wherein the decoding the attribute data includes:
deriving a predictor for the attribute data based on the laser identifier,
wherein a weight for the predictor is generated based on attribute data of a reference frame for the frame.

8. The method of claim 7, wherein the decoding of the point cloud data comprises:
decoding the point cloud data based on a predictive tree, wherein the point cloud data is predicted based on points in the reference frame.

9. The method of claim 7, wherein the decoding of the point cloud data comprises:
sorting points of the point cloud data based on an azimuth according to a laser ID.

10. The method of claim 9, wherein points in the frame containing the point cloud data and a reference frame for the frame are sorted based on the laser ID and the azimuth,
wherein a predictor for the points in the frame is selected from the sorted points in the frame and the reference frame.

11. The method of claim 10, based on that a value generated based on an attribute for the frame, an attribute for the reference frame, and the weight is greater than or equal to a threshold, the attribute is predicted based on the attribute for the reference frame,
wherein, based on that the value generated based on the attribute for the frame, the attribute for the reference frame, and the weight is less than the threshold, the attribute is predicted based on the attribute for the frame.

12. A method of transmitting data for point cloud data comprising:
obtaining a bitstream generated by generating information related to that point cloud data in a frame is encoded based on an inter-prediction for a laser identifier;
encoding geometry data of the point cloud data; and
encoding attribute data of the point cloud data, wherein the encoding the attribute data includes: searching a predictor for the attribute data based on a weight,
wherein the weight for the predictor is generated based on attribute data of a reference frame for the frame; and
transmitting data for the bitstream.

* * * * *